United States Patent
Chen et al.

(10) Patent No.: US 9,225,961 B2
(45) Date of Patent: Dec. 29, 2015

(54) FRAME PACKING FOR ASYMMETRIC STEREO VIDEO

(75) Inventors: Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 641 days.

(21) Appl. No.: 13/035,448

(22) Filed: Feb. 25, 2011

(65) Prior Publication Data

US 2011/0280316 A1  Nov. 17, 2011

Related U.S. Application Data

(60) Provisional application No. 61/334,253, filed on May 13, 2010, provisional application No. 61/366,436, filed on Jul. 21, 2010, provisional application No. 61/433,110, filed on Jan. 14, 2011.

(51) Int. Cl.

| | |
|---|---|
| *H04N 7/12* | (2006.01) |
| *H04N 13/00* | (2006.01) |
| *H04N 19/597* | (2014.01) |
| *H04N 19/70* | (2014.01) |

(Continued)

(52) U.S. Cl.
CPC ......... *H04N 13/0048* (2013.01); *H04N 19/523* (2014.11); *H04N 19/59* (2014.11); *H04N 19/597* (2014.11); *H04N 19/61* (2014.11); *H04N 19/70* (2014.11); *H04N 19/82* (2014.11)

(58) Field of Classification Search
CPC .................................................. H04N 13/0048
USPC ..................................................... 375/240.25
See application file for complete search history.

(56) References Cited

U.S. PATENT DOCUMENTS

| | | | |
|---|---|---|---|
| 3,909,721 A | 9/1975 | Bussgang et al. | |
| 4,365,338 A | 12/1982 | McRae et al. | |

(Continued)

FOREIGN PATENT DOCUMENTS

| | | |
|---|---|---|
| CN | 101371584 A | 2/2009 |
| CN | 101622879 A | 1/2010 |

(Continued)

OTHER PUBLICATIONS

C. Fehn, P. Kauff, S. Cho, H. Kwon, N. Hur, J. Kim, T-DMB, Proc. 3DTV-CON 2007, Kos Island, Greece, May 2007.*

(Continued)

*Primary Examiner* — Richard Torrente
(74) *Attorney, Agent, or Firm* — Todd E. Marlette

(57) ABSTRACT

An asymmetric frame of a coded video bitstream may include a full resolution picture of a left view and a reduced resolution picture of a right view, where the left and right views form a stereo view pair for three-dimensional video playback. In one example, an apparatus includes a video encoder configured to receive a first picture of a first view of a scene having a first resolution, receive a second picture of a second view of the scene having a reduced resolution relative to the first resolution, form an asymmetric frame including the first picture and the second picture, and encode the asymmetric frame. In this manner, decoders of varying capabilities may receive the same bitstream, and the bitstream may consume less bandwidth than one or more bitstreams having full resolution pictures of a stereo view pair. The bitstream may have better quality than a bitstream having subsampled pictures.

50 Claims, 12 Drawing Sheets

(51) Int. Cl.
*H04N 19/61* (2014.01)
*H04N 19/82* (2014.01)
*H04N 19/523* (2014.01)
*H04N 19/59* (2014.01)

(56) References Cited

U.S. PATENT DOCUMENTS

| | | | |
|---|---|---|---|
| 4,589,112 A | 5/1986 | Karim |
| 5,136,592 A | 8/1992 | Weng |
| 5,153,591 A | 10/1992 | Clark |
| 5,329,369 A | 7/1994 | Willis et al. |
| 5,331,320 A | 7/1994 | Cideciyan et al. |
| 5,371,532 A | 12/1994 | Gelman et al. |
| 5,372,532 A | 12/1994 | Robertson, Jr. |
| 5,379,297 A | 1/1995 | Glover et al. |
| 5,421,031 A | 5/1995 | De Bey |
| 5,425,050 A | 6/1995 | Schreiber et al. |
| 5,432,787 A | 7/1995 | Chethik |
| 5,455,823 A | 10/1995 | Noreen et al. |
| 5,465,318 A | 11/1995 | Sejnoha |
| 5,517,508 A | 5/1996 | Scott |
| 5,524,025 A | 6/1996 | Lawrence et al. |
| 5,568,614 A | 10/1996 | Mendelson et al. |
| 5,583,784 A | 12/1996 | Kapust et al. |
| 5,608,738 A | 3/1997 | Matsushita |
| 5,617,541 A | 4/1997 | Albanese et al. |
| 5,642,365 A | 6/1997 | Murakami et al. |
| 5,659,614 A | 8/1997 | Bailey, III |
| 5,701,582 A | 12/1997 | DeBey |
| 5,751,336 A | 5/1998 | Aggarwal et al. |
| 5,757,415 A | 5/1998 | Asamizuya et al. |
| 5,805,825 A | 9/1998 | Danneels et al. |
| 5,835,165 A | 11/1998 | Keate et al. |
| 5,852,565 A | 12/1998 | Demos |
| 5,870,412 A | 2/1999 | Schuster et al. |
| 5,903,775 A | 5/1999 | Murray |
| 5,917,852 A | 6/1999 | Butterfield et al. |
| 5,926,205 A | 7/1999 | Krause et al. |
| 5,933,056 A | 8/1999 | Rothenberg |
| 5,936,659 A | 8/1999 | Viswanathan et al. |
| 5,936,949 A | 8/1999 | Pasternak et al. |
| 5,953,537 A | 9/1999 | Balicki et al. |
| 5,970,098 A | 10/1999 | Herzberg |
| 5,983,383 A | 11/1999 | Wolf |
| 5,993,056 A | 11/1999 | Vaman et al. |
| 6,005,477 A | 12/1999 | Deck et al. |
| 6,011,590 A | 1/2000 | Saukkonen |
| 6,012,159 A | 1/2000 | Fischer et al. |
| 6,014,706 A | 1/2000 | Cannon et al. |
| 6,018,359 A | 1/2000 | Kermode et al. |
| 6,044,485 A | 3/2000 | Dent et al. |
| 6,055,012 A | 4/2000 | Haskell et al. |
| 6,073,250 A | 6/2000 | Luby et al. |
| 6,079,042 A | 6/2000 | Vaman et al. |
| 6,081,907 A | 6/2000 | Witty et al. |
| 6,081,909 A | 6/2000 | Luby et al. |
| 6,081,918 A | 6/2000 | Spielman |
| 6,088,330 A | 7/2000 | Bruck et al. |
| 6,097,320 A | 8/2000 | Kuki et al. |
| 6,134,596 A | 10/2000 | Bolosky et al. |
| 6,141,053 A | 10/2000 | Saukkonen |
| 6,141,788 A | 10/2000 | Rosenberg et al. |
| 6,144,762 A | 11/2000 | Brooks |
| 6,154,452 A | 11/2000 | Marko et al. |
| 6,163,870 A | 12/2000 | Luby et al. |
| 6,166,544 A | 12/2000 | Debbins et al. |
| 6,175,944 B1 | 1/2001 | Urbanke et al. |
| 6,178,536 B1 | 1/2001 | Sorkin |
| 6,185,265 B1 | 2/2001 | Campanella |
| 6,195,777 B1 | 2/2001 | Luby et al. |
| 6,223,324 B1 | 4/2001 | Sinha et al. |
| 6,229,824 B1 | 5/2001 | Marko |
| 6,243,846 B1 | 6/2001 | Schuster et al. |
| 6,272,658 B1 | 8/2001 | Steele et al. |
| 6,278,716 B1 | 8/2001 | Rubenstein et al. |
| 6,298,462 B1 | 10/2001 | Yi |
| 6,307,487 B1 | 10/2001 | Luby |
| 6,314,289 B1 | 11/2001 | Eberlein et al. |
| 6,320,520 B1 | 11/2001 | Luby |
| 6,333,926 B1 | 12/2001 | Van Heeswyk et al. |
| 6,373,406 B2 | 4/2002 | Luby |
| 6,393,065 B1 | 5/2002 | Piret et al. |
| 6,411,223 B1 | 6/2002 | Haken et al. |
| 6,420,982 B1 | 7/2002 | Brown |
| 6,421,387 B1 | 7/2002 | Rhee |
| 6,430,233 B1 | 8/2002 | Dillon et al. |
| 6,445,717 B1 | 9/2002 | Gibson et al. |
| 6,459,811 B1 | 10/2002 | Hurst, Jr. |
| 6,466,698 B1 | 10/2002 | Creusere |
| 6,473,010 B1 | 10/2002 | Vityaev et al. |
| 6,486,803 B1 | 11/2002 | Luby et al. |
| 6,487,692 B1 | 11/2002 | Morelos-Zaragoza |
| 6,496,980 B1 | 12/2002 | Tillman et al. |
| 6,510,177 B1 | 1/2003 | De Bonet et al. |
| 6,523,147 B1 | 2/2003 | Kroeger et al. |
| 6,535,920 B1 | 3/2003 | Parry et al. |
| 6,609,223 B1 | 8/2003 | Wolfgang |
| 6,614,366 B2 | 9/2003 | Luby |
| 6,618,451 B1 | 9/2003 | Gonikberg |
| 6,633,856 B2 | 10/2003 | Richardson et al. |
| 6,643,332 B1 | 11/2003 | Morelos-Zaragoza et al. |
| 6,677,864 B2 | 1/2004 | Khayrallah |
| 6,678,855 B1 | 1/2004 | Gemmell |
| 6,694,476 B1 | 2/2004 | Sridharan et al. |
| 6,704,370 B1 | 3/2004 | Chheda et al. |
| 6,732,325 B1 | 5/2004 | Tash et al. |
| 6,742,154 B1 | 5/2004 | Barnard |
| 6,748,441 B1 | 6/2004 | Gemmell |
| 6,751,772 B1 | 6/2004 | Kim et al. |
| 6,810,499 B2 | 10/2004 | Sridharan et al. |
| 6,820,221 B2 | 11/2004 | Fleming |
| 6,831,172 B1 | 12/2004 | Barbucci et al. |
| 6,849,803 B1 | 2/2005 | Gretz |
| 6,850,736 B2 | 2/2005 | McCune, Jr. |
| 6,856,263 B2 | 2/2005 | Shokrollahi et al. |
| 6,868,083 B2 | 3/2005 | Apostolopoulos et al. |
| 6,882,618 B1 | 4/2005 | Sakoda et al. |
| 6,895,547 B2 | 5/2005 | Eleftheriou et al. |
| 6,909,383 B2 | 6/2005 | Shokrollahi et al. |
| 6,928,603 B1 | 8/2005 | Castagna et al. |
| 6,956,875 B2 | 10/2005 | Kapadia et al. |
| 6,965,636 B1 | 11/2005 | DesJardins et al. |
| 6,995,692 B2 | 2/2006 | Yokota et al. |
| 7,010,052 B2 | 3/2006 | Dill et al. |
| 7,030,785 B2 | 4/2006 | Shokrollahi et al. |
| 7,057,534 B2 | 6/2006 | Luby |
| 7,068,729 B2 | 6/2006 | Shokrollahi et al. |
| 7,072,971 B2 | 7/2006 | Lassen et al. |
| 7,110,412 B2 | 9/2006 | Costa et al. |
| 7,139,660 B2 | 11/2006 | Sarkar et al. |
| 7,139,960 B2 | 11/2006 | Shokrollahi |
| 7,154,951 B2 | 12/2006 | Wang |
| 7,164,370 B1 | 1/2007 | Mishra |
| 7,168,030 B2 | 1/2007 | Ariyoshi |
| 7,219,289 B2 | 5/2007 | Dickson |
| 7,233,264 B2 | 6/2007 | Luby |
| 7,240,236 B2 | 7/2007 | Cutts et al. |
| 7,243,285 B2 | 7/2007 | Foisy et al. |
| 7,254,754 B2 | 8/2007 | Hetzler et al. |
| 7,293,222 B2 | 11/2007 | Shokrollahi et al. |
| 7,318,180 B2 | 1/2008 | Starr |
| 7,320,099 B2 | 1/2008 | Miura et al. |
| 7,398,454 B2 | 7/2008 | Cai et al. |
| 7,412,641 B2 | 8/2008 | Shokrollahi |
| 7,418,651 B2 | 8/2008 | Luby et al. |
| 7,483,489 B2 | 1/2009 | Gentric et al. |
| 7,512,697 B2 | 3/2009 | Lassen et al. |
| 7,574,706 B2 | 8/2009 | Meulemans et al. |
| 7,633,413 B2 | 12/2009 | Shokrollahi et al. |
| 7,644,335 B2 | 1/2010 | Luby et al. |
| 7,650,036 B2 | 1/2010 | Lei et al. |
| 7,721,184 B2 | 5/2010 | Luby et al. |
| 8,780,998 B2 * | 7/2014 | Pandit et al. ............. 375/240.25 |
| 8,812,735 B2 | 8/2014 | Igarashi |

(56) References Cited

U.S. PATENT DOCUMENTS

| | | |
|---|---|---|
| 2002/0009137 A1 | 1/2002 | Nelson et al. |
| 2002/0053062 A1 | 5/2002 | Szymanski |
| 2002/0191116 A1 | 12/2002 | Kessler et al. |
| 2003/0086515 A1 | 5/2003 | Trans et al. |
| 2003/0106014 A1 | 6/2003 | Dohmen et al. |
| 2003/0226089 A1 | 12/2003 | Rasmussen et al. |
| 2004/0151109 A1 | 8/2004 | Batra et al. |
| 2004/0207548 A1 | 10/2004 | Kilbank |
| 2005/0041736 A1 | 2/2005 | Butler-Smith et al. |
| 2005/0138286 A1 | 6/2005 | Franklin et al. |
| 2005/0169379 A1 | 8/2005 | Shin et al. |
| 2005/0195899 A1 | 9/2005 | Han |
| 2005/0195900 A1 | 9/2005 | Han |
| 2005/0254575 A1 | 11/2005 | Hannuksela et al. |
| 2006/0093634 A1 | 5/2006 | Lutz et al. |
| 2006/0109805 A1 | 5/2006 | Malamal Vadakital et al. |
| 2006/0193524 A1 | 8/2006 | Tarumoto et al. |
| 2006/0212782 A1 | 9/2006 | Li |
| 2006/0262856 A1 | 11/2006 | Wu et al. |
| 2006/0279437 A1 | 12/2006 | Luby et al. |
| 2007/0081586 A1 | 4/2007 | Raveendran et al. |
| 2007/0110074 A1 | 5/2007 | Bradley et al. |
| 2007/0127576 A1 | 6/2007 | Henocq et al. |
| 2007/0159476 A1 | 7/2007 | Grasnick |
| 2007/0177811 A1 | 8/2007 | Yang et al. |
| 2007/0195894 A1 | 8/2007 | Shokrollahi et al. |
| 2007/0201549 A1 | 8/2007 | Hannuksela et al. |
| 2007/0204196 A1 | 8/2007 | Watson et al. |
| 2007/0230564 A1 | 10/2007 | Chen et al. |
| 2007/0230568 A1 | 10/2007 | Eleftheriadis et al. |
| 2007/0274389 A1 | 11/2007 | Kim et al. |
| 2007/0300127 A1 | 12/2007 | Watson et al. |
| 2008/0152241 A1 | 6/2008 | Itoi et al. |
| 2008/0170806 A1 | 7/2008 | Kim |
| 2008/0256418 A1 | 10/2008 | Luby et al. |
| 2008/0303893 A1 | 12/2008 | Kim et al. |
| 2008/0303896 A1 | 12/2008 | Lipton et al. |
| 2008/0309525 A1 | 12/2008 | Shokrollahi et al. |
| 2009/0067551 A1 | 3/2009 | Chen et al. |
| 2009/0125636 A1 | 5/2009 | Li et al. |
| 2009/0195640 A1 | 8/2009 | Kim et al. |
| 2009/0201990 A1 | 8/2009 | Leprovost et al. |
| 2009/0204877 A1 | 8/2009 | Betts |
| 2009/0210547 A1 | 8/2009 | Lassen et al. |
| 2009/0219985 A1 | 9/2009 | Swaminathan et al. |
| 2010/0020871 A1 | 1/2010 | Hannuksela et al. |
| 2010/0046906 A1 | 2/2010 | Kanamori et al. |
| 2010/0165077 A1 | 7/2010 | Yin et al. |
| 2010/0235472 A1 | 9/2010 | Sood et al. |
| 2011/0032333 A1 | 2/2011 | Neuman et al. |
| 2011/0083144 A1 | 4/2011 | Bocharov et al. |
| 2011/0119394 A1 | 5/2011 | Wang et al. |
| 2011/0119396 A1 | 5/2011 | Kwon et al. |
| 2011/0280311 A1 | 11/2011 | Chen et al. |
| 2012/0020413 A1 | 1/2012 | Chen et al. |
| 2012/0105583 A1* | 5/2012 | Suh et al. ............... 348/43 |
| 2014/0009578 A1 | 1/2014 | Chen et al. |

FOREIGN PATENT DOCUMENTS

| | | |
|---|---|---|
| EP | 0854650 A2 | 7/1998 |
| EP | 1024672 A1 | 8/2000 |
| EP | 1241795 A2 | 9/2002 |
| EP | 1455504 A2 | 9/2004 |
| EP | 1501318 A1 | 1/2005 |
| EP | 1670256 A2 | 6/2006 |
| EP | 2071827 A2 | 6/2009 |
| EP | 2096870 A2 | 9/2009 |
| JP | 11112479 | 4/1999 |
| JP | 2000216835 A | 8/2000 |
| JP | 2001036417 | 2/2001 |
| JP | 2001274855 A | 10/2001 |
| JP | 2002204219 A | 7/2002 |
| JP | 2003507985 | 2/2003 |
| JP | 2004048704 A | 2/2004 |
| JP | 3809957 | 6/2006 |
| JP | 2007506167 A | 3/2007 |
| JP | 3976163 | 6/2007 |
| KR | 100479206 B1 | 3/2005 |
| KR | 20100015611 A | 2/2010 |
| WO | WO9634463 A1 | 10/1996 |
| WO | WO98032231 | 7/1998 |
| WO | WO0014921 A1 | 3/2000 |
| WO | WO00018017 | 3/2000 |
| WO | WO0120786 A1 | 3/2001 |
| WO | WO0157667 A1 | 8/2001 |
| WO | WO0158130 A2 | 8/2001 |
| WO | WO0158131 A2 | 8/2001 |
| WO | WO0227988 A2 | 4/2002 |
| WO | WO0247391 A1 | 6/2002 |
| WO | WO03056703 | 7/2003 |
| WO | WO03105350 | 12/2003 |
| WO | WO2004047455 A1 | 6/2004 |
| WO | 2004105300 | 12/2004 |
| WO | 2005022812 | 3/2005 |
| WO | 2005120079 A2 | 12/2005 |
| WO | 2006135877 A2 | 12/2006 |
| WO | 2007115129 | 10/2007 |
| WO | WO2008054100 A1 | 5/2008 |
| WO | WO2008148708 A1 | 12/2008 |
| WO | 2010041896 A2 | 4/2010 |
| WO | WO2010085361 A2 | 7/2010 |
| WO | 2010088420 A1 | 8/2010 |
| WO | WO2010120804 A1 | 10/2010 |

OTHER PUBLICATIONS

Chen Ying et al., "Coding techniques in Multiview Video Coding and Joint Multiview Video Model", Picture Coding Symposium, 2009, PCS 2009, IEEE, Piscataway, NJ, USA, May 6, 2009, pp. 1-4, XP031491747, ISBN: 978-1-4244-4593-6.

Grineberg, et al., "Deliverable D3.2 MVC/SVC storage format" Jan. 29, 2009, XP002599508 Retrieved from the Internet: URL:http://www.ist-sea.eu/Public/SEA_D3.2_HHI FF_20090129.pdf [retrieved on Sep. 1, 2010] paragraph [02.3].

Ian Trow, "Is 3D Event Coverage Using Existing Broadcast Infrastructure Technically Possible", International Broadcasting Conference, Sep. 9, 2009-Sep. 13, 2009, XP030081671, pp. 4-5, "3D transmission over broadcast infrastructure" pp. 7-8, "Screen signaling"—Conclusions on 3D systems.

International Search Report and Written Opinion—PCT/US2011/036499, ISA/EPO—Aug. 29, 2011.

Kimata H et al., "Inter-View Prediction With Downsampled Reference Pictures", ITU Study Group 16—Video Coding Experts Group—ISO/IEC MPEG & ITU-T VCEG(ISO/IEC JTC1/SC29/WG11 and ITU-T SG16 Q6), No. JVT-W079, Apr. 19, 2007, XP030007039.

Smolic et al., "Development of a new MPEG standard for advanced 3D video applications", Proceedings of 6th International Symposium on Image and Signal Processing and Analysis (ISPA), Sep. 16, 2009, pp. 400-407, IEEE, XP031552049, ISBN: 978-953-184-135-1.

3GPP, "Transparent end-to-end packet-switched streaming service (PSS): Protocols and codecs (Release 9)," 3GPP TS 26.234, version 9.1 .0, Release 9, Sophia Antipolis, Valbonne, FR, (Dec. 2009), 179 pp.

3GPP TS 26.244 V9.1.0, 3rd Generation Partnership Project; Technical Specification Group Services and System Aspects; Transparent end-to-end packet switched streaming service (PSS); 3GPP file format (3GP), (Release 9), Mar. 2010, 55 pp.

3GPP TS 26.247, v1.5.0, 3rd Generation Partnership Project; Technical Specification Group Services and System Aspects Transparent end-to-end Packet-switched Streaming Service (PSS); Progressive Download and Dynamic Adaptive Streaming over HTTP (3GP-DASH) (Release 10), 2010.

3rd Generation Partnership Project, Technical Specification Group Services and System Aspects Transparent end-to-end packet switched streaming service (PSS), 3GPP file format (3GP) (Release 8) , 3GPP Standard, 3GPP TS 26.244, 3rd Generation Partnership Project (3GPP), Mobile Competence Centre , 650, Route Des

(56) References Cited

OTHER PUBLICATIONS

Lucioles, F-06921 Sophia-Antipolis Cedex, France, No. V8.1.0, Jun. 1, 2009, pp. 1-52, XP050370199.
Aggarwal, C. et al.: "A Permutation-Based Pyramid Broadcasting Scheme for Video-on-Demand Systems," Proc. IEEE Int'l Conf. on Multimedia Systems, Hiroshima, Japan (Jun. 1996).
Aggarwal, C. et al.: "On Optimal Batching Policies for Video-on-Demand Storage Servers," Multimedia Systems, vol. 4, No. 4, pp. 253-258 (1996).
Almeroth, et al., "The use of multicast delivery to provide a scalable and interactive video-on-demand service", IEEE Journal on Selected Areas in Communication, 14(6): 1110-1122, (1996).
Alon, et al.: "Linear Time Erasure Codes with Nearly Optimal Recovery," Proceedings of the Annual Symposium on Foundations of Computer Science, US, Los Alamitos, IEEE Comp. Soc. Press, vol. Symp. 36, pp. 512-516 (Oct. 23, 1995) XP000557871.
Amin Shokrollahi: "LDPC Codes: An Introduction" Internet Citation 2 Apr. 1, 2003 (Apr. 2, 2003), XP002360065 Retrieved from the Internet: URL : http://www.ipm.ac.ir/IPM/homepage/Amin 2. pdf [retrieved on Dec. 19, 2005].
Bar-Noy, et al., "Competitive on-line stream merging algorithms for media-on-demand", Draft (Jul. 2000).
Bar-Noy et al. "Efficient algorithms for optimal stream merging for media-on-demand," Draft (Aug. 2000).
Bigloo, A. et al.: "A Robust Rate-Adaptive Hybrid ARQ Scheme and Frequency Hopping for Multiple-Access Communication Systems," IEEE Journal on Selected Areas in Communications, US, IEEE Inc, New York (Jun. 1, 1994) pp. 917-924, XP000464977.
Bitner, J.R., et al.: "Efficient Generation of the Binary Reflected Gray code and Its Applications," Communications of the ACM, pp. 517-521, vol. 19 (9), 1976.
Blomer, et al.: "An XOR-Based Erasure-Resilient Coding Scheme," ICSI Technical Report No. TR-95-048 Berkley, CA (1995), pp. 1-19, XP002181848. [avail. At ftp://ftp.icsi.berkeley.edu/pub/techreports/1995/tr-95-048.pdf].
Byers, J.W. et al.: "A Digital Fountain Approach to Reliable Distribution of Bulk Data," Computer Communication Review, Association for Computing Machinery. New York, US, vol. 28, No. 4 (Oct. 1998) pp. 56-67 XP000914424 ISSN:0146-4833.
Byers, J.W. et al.: "Accessing multiple mirror sites in parallel: using Tornado codes to speed up downloads," 1999, Eighteenth Annual Joint Conference of the IEEE Comupter and Communications Socities, pp. 275-283, Mar. 21, 1999, XP000868811.
Clark G.C., et al., "Error Correction Coding for Digital Communications, System Applications," Error Correction Coding for Digital Communications, New York, Plenum Press, US, Jan. 1, 1981, pp. 339-341.
Dan, A. et al.: "Scheduling Policies for an On-Demand Video Server with Batching," Proc. ACM Multimedia, pp. 391-398 (Oct. 1998).
Davey, M.C. et al.: "Low Density Parity Check Codes over GF(q)" IEEE Communications Letters, vol. 2, No. 6 pp. 165-167 (1998).
David Singer et al., "ISO/IEC 14496-15/FDIS, International Organization for Standardization Organization Internationale De Normalization ISO/IEC JTC1/SC29/WG11 Coding of Moving Pictures and Audio", ISO/IEC 2003, Aug. 11, 2003, pp. 1-34.
Digital Fountain: "Raptor code specification for MBMS file download," 3GPP SA4 PSM AD-HOC #31 (May 21, 2004) XP002355055 pp. 1-6.
Digital Fountain: "Specification Text for Raptor Forward Error Correction," TDOC S4-050249 of 3GPP TSG SA WG 4 Meeting #34 [Online] (Feb. 25, 2005) pp. 1-23, XP002425167, Retrieved from the Internet: URL:http://www.3gpp.org/ftp/tsg_sa/WG4_CODEC/TSGS4_34/Docs.
D.M. Mandelbaum: "An adaptive-feedback coding scheme using incremental redundancy", IEEE Trans on Information Theory, vol. May 1974, pp. 388-389, XP002628271, the whole document.
Eager, et al. "Minimizing bandwidth requirements for on-demand data delivery," Proceedings of the International Workshop on Advances in Multimedia Information Systems,p. 80-87 (Indian Wells, CA Oct. 1999).
Eager, et al., "Optimal and efficient merging schedules for video-on-demand servers", Proc. ACM Multimedia, vol. 7, pp. 199-203 (1999).
Esaki, et al.: "Reliable IP Multicast Communication Over ATM Networks Using Forward Error Correction Policy," IEICE Transactions on Communications, JP, Institute of Electronics Information and Comm. Eng. Tokyo, vol. E78-V, No. 12, (Dec. 1995), pp. 1622-1637, XP000556183.
Feng, G., Error Correcting Codes over Z2m for Algorithm-Based Fault-Tolerance, IEEE Transactions on Computers, vol. 43, No. 3, Mar. 1994, pp. 370-374.
Fielding et al., "Hypertext Transfer Protocol—HTTP/1.1," Network Working Group, RFC 2616, Jun. 1999, 165 pp.
Frojdh et al., "File format sub-track selection and switching," ISO/IEC JTC1/SC29/WG11 MPEG2009 M16665, London UK., Jul. 2009, 14 pp.
Gao, L. et al.: "Efficient Schemes for Broadcasting Popular Videos," Proc. Inter. Workshop on Network and Operating System Support for Digital Audio and Video, pp. 1-13 (1998).
Gemmell, et al., "A Scalable Multicast Architecture for One-To-Many Telepresentations", Multimedia Computing and Systems, 1998/Proceedings. IEEE International Conference on Austin, TX, USA Jun. 28-Jul. 1, 1998, Los Alamitos, CA USA, IEEE Comput. Soc, US, Jun. 28, 1998, pp. 128-139, XP010291559.
Hagenauer, J. : "Soft is better than hard" Communications, Coding and Cryptology, Kluwer Publication May 1994, XP002606615 Retrieved from the Internet : URL: http://www. Int . ei .turn. de/veroeffentlic hungen/l994/ccc94h. pdf [retrieved on Oct. 25, 2010].
Heiko Schwarz, et al., "Overview of the Scalable Video Coding Extension of the H.264/AVC Standard", IEEE Transactions on Circuits and Systems for Video Technology, vol. 17, No. 9, Sep. 2007, pp. 1103-1120.
Hershey, et al., "Random Parity Coding (RPC)", 1996 IEEE International Conference on Communications (ICC). Converging Technologies for Tomorrow's Applications. Dallas, Jun. 23-27, 1996, IEEE International Conference on Communications (ICC), New York, IEEE, US, vol. 1, Jun. 23, 1996, pp. 122-126, XP000625654.
Hua, et al., "Skyscraper broadcasting: A new broadcsting system for metropolitan video-on-demand systems", Proc. ACM SIGCOMM, pp. 89-100 (Cannes, France, 1997).
Information Technology—Generic Coding of Moving Pictures and Audio: Systems, Amendment 4: Transport of Multiview Video over ITU-T Rec H.222.0 | ISO/IEC 13818-1 "Text of ISO/IEC 13818-1:2007/FPDAM 4—Transport of Multiview Video over ITU-T Rec H.222.0 | ISO/IEC 13818-1," Lausanne, Switzerland, 2009, 21 pp.
ISO/IEC 13818-1, "Information technology—Generic coding of moving pictures and associated audio information: Systems," Second edition, Dec. 1, 2000, 174 pp.
"ISO/IEC JTC 1/SC 29, ISO/IEC FCD 23001-6, Information technology—MPEG systems technologies—Part 6: Dynamic adaptive streaming over HTTP (DASH), Jan. 28, 2011".
"Joint Draft 8.0 on Multiview Video Coding", 28th JVT meeting, Hannover, Germany, Jul. 2008. available from http:// wftp3. itu.int/av-arch/jvt-site/2008_07_Hannover/JVT-AB204.
Juhn, L. et al.: "Adaptive Fast Data Broadcasting Scheme for Video-on-Demand Service," IEEE Transactions on Broadcasting, vol. 44, No. 2, pp. 182-185 (Jun. 1998).
Juhn, L. et al.: "Harmonic Broadcasting for Video-on-Demand Service," IEEE Transactions on Broadcasting, vol. 43, No. 3, pp. 268-271 (Sep. 1997).
Kallel, "Complementary Punctured Convolutional (CPC) Codes and Their Applications", IEEE Transactions on Communications, IEEE Inc., New York, US, vol. 43, No. 6, Jun. 1, 1995, pp. 2005-2009.
Kozamernik F: "Media streaming over the Internet", Internet Citation, Oct. 2002, XP002266291, Retrieved from the Internet: URL: http://www.ebu.ch/trev_292-kozamerni k. pdf [retrieved on Jan. 8, 2004] section "Video codecs for scalable streaming".
Lin, S. et al.: "Error Control Coding-Fundamentals and Applications," 1983, Englewood Cliffs, pp. 288, XP002305226.
Luby, et al., "Analysis of Low Density Codes and Improved Designs Using Irregular Graphs, 1998, Proceedings of the 30th Annual ACM Symposium on Theory of Computing", May 23, 1998, pp. 249-258, XP000970907.

(56) References Cited

OTHER PUBLICATIONS

Luby et al., "Improved Low-Density Parity-Check Codes Using Irregular Graphs and Belief Propogation", Information Theory, 1998. Proceedings. 1998 IEEE International Symposium on Cambridge, MA, USA Aug. 16-21, 1998, New York, NY, USA, IEEE, US Aug. 16, 199.

Luby, et al.: "Analysis of Low Density Codes and Improved Designs Using Irregular Graphs," International Computer Science Institute Technical Report TR-97-045 (Nov. 1997) [available at ftp://ftp.icsi.berkeley.edu/pub/techreports/1997/tr-97-045.pdf].

Luby, M. et al.: "Efficient Erasure Correction Codes," 2001, IEEE Transactions on Information Theory, Vo. 47, No. 2, pp. 569-584, XP002305225.

Luby, M. et al.: "Practical Loss-Resilient Codes: Tornado Codes," 29th Annual ACM Symposium on Theory of Computing, vol. SYMP. 29, May 4, 1997, pp. 1-10, XP002271229.

Luby, Michael G. "Analysis of Random Processes via and-or Tree Evaluation," Proceedings of the 9th Annual ACM-SIAM Symposium on Discrete Algorithms,TR-97-0, 1998, pp. 364-373, (search date: Jan. 25, 2010) URL: <http://portal.acm.prg.citation.cfm?id=314722>.

Min-Goo Kim: "On systematic punctured convolutional codes", IEEE Trans on Communications, vol. 45, No. 2, Feb. 1997, XP002628272, the whole document, pp. 133-139.

Muller, et al., "A test-bed for the dynamic adaptive streaming over HTTP featuring session mobility" MMSys '11 Proceedings of the second annual ACM conference on Multimedia systems, Feb. 23-25, 2011, San Jose, CA, pp. 271-276.

Naguib, Ayman, et al., "Applications of Space-Time Block Codes and Interference Suppression for High Capacity and High Data Rate Wireless Systems," IEEE, 1998, pp. 1803-1810.

Narayanan, et al., "Physical Layer Design for Packet Data Over IS-136", Vehicular Technology Conference, 1997, IEEE 47th Phoenix, AZ, USA May 4-7, 1997, New York, NY, USA, IEEE, US May 4, 1997, pp. 1029-1033.

Nonnenmacher, et al., "Parity-Based Loss Recovery for Reliable Multicast Transmission", IEEE / ACM Transactions on Networking, IEEE Inc. New York, US, vol. 6, No. 4, Aug. 1, 1998, pp. 349-361.

Ozden, B. et al.: "A Low-Cost Storage Service for Movie on Demand Databases," Proceedings of the 20th Very Large DataBases (VLDB) Conference, Santiago, Chile (1994).

Pa. Chou, A. Mohr, A. Wang, S. Mehrotra, "FEC and Pseudo-ARQ for Receiver-Driven Layered Multicast of Audio and Video," pp. 440-449, IEEE Computer Society, Data Compression Conference (2000).

Paris, et al., "A low bandwidth broadcasting protocol for video on demand", Proc. International Conference on Computer Communications and Networks, vol. 7, pp. 690-697 (Oct. 1998).

Paris, et al., "Efficient broadcasting protocols for video on demand", International Symposium on Modeling, Analysis and Simulation of Computer and Telecommunication systems (MASCOTS), vol. 6, pp. 127-132 (Jul. 1998).

Perkins, et al.: "Survey of Packet Loss Recovery Techniques for Streaming Audio," IEEE Network; Sep./Oct. 1998, pp. 40-48.

Pless and WC Huffman EDS V S: Algebraic geometry codes, Handbook of Coding Theory, 1998, pp. 871-961, XP002300927.

Pursley, et al.: "Variable-Rate Coding for Meteor-Burst Communications," IEEE Transactions on Communications, US, IEEE Inc. New York (1989) vol. 37, No. 11, pp. 1105-1112 XP000074533.

Pursley, M. et al.: "A Correction and an Addendum for Variable-Rate Coding for Meteor-Burst Communications," IEEE Transactions on Communications, vol. 43, No. 12 pp. 2866-2867 (Dec. 1995).

Rangan, et al., "Designing an On-Demand Multimedia Service," IEEE Communication Magazine, vol. 30, pp. 5-65, (Jul. 1992).

Rizzo, L. "Effective Erasure Codes for Reliable Computer Communication Protocols," Computer Communication Review, 27 (2) pp. 24-36 (Apr. 1, 1997), XP000696916.

Roca, V. et al.: "Design, Evaluation and Comparison of Four Large Block FEC Codecs, LDPC, LDGM, LDGM Staircase and LDGM Triangle, plus a Reed-Solomon Small Block FEC Codec," INRIA Research Report RR-5225 (2004).

Rost, S. et al.: "The Cyclone Server Architecture: streamlining delivery of popular content," 2002, Computer Communications, vol. 25, No. 4, pp. 403-412.

Roth, R., et al., "A Construction of Non-Reed-Solomon Type MDS Codes", IEEE Transactions of Information Theory, vol. 35, No. 3, May 1989, pp. 655-657.

Roth, R., "On MDS Codes via Cauchy Matrices", IEEE Transactions on Information Theory, vol. 35, No. 6, Nov. 1989, pp. 1314-1319.

Seshan, S. et al.: "Handoffs in Cellular Wireless Networks: The Daedalus Implementation and Experience," Wireless Personal Communications, NL; Kluwer Academic Publishers, vol. 4, No. 2 (Mar. 1, 1997) pp. 141-162, XP000728589.

Shacham: "Packet Recovery and Error Correction in High-Speed Wide-Area Networks," Proceedings of the Military Communications Conference. (Milcom), US, New York, IEEE, vol. 1, pp. 551-557 (1989) XP000131876.

Shierl T; Gruneberg K; Narasimhan S; Vetro A: "ISO/IEC 13818-1:2007/FPDAM 4—Information Technology Generic Coding of Moving Pictures and Audio Systems amendment 4: Transport of Multiview Video over ITU-T Rec H.222.0 ISO/IEC 13818-1" ITU-T REC. H.222.0(May 2006)FPDAM 4, vol. MPEG2009, No. 10572, May 11, 2009, pp. 1-20, XP002605067 p. 11, last two paragraphs sections 2.6.78 and 2.6.79 table T-1.

Shokrollahi, A.: "Raptor Codes," Internet Citation [Online] (Jan. 13, 2004) XP002367883, Retrieved from the Internet: URL:http://www.cs.huji.ac.il/labs/danss/p2p/resources/raptor.pdf.

Shokrollahi, Amin. "Raptor Codes," IEEE Transactions on Information Theory, Jun. 2006, vol. 52, No. 6, pp. 2551-2567, (search date: Feb. 1, 2010) URL: <http://portal.acm.org/citation.cfm?id=1148681>.

Shokrollahi et al., "Design of Efficient Easure Codes with Differential Evolution", IEEE International Symposium on Information Theory, Jun. 25, 2000, pp. 5-5.

Sincoskie, W. D., "System Architecture for Large Scale Video on Demand Service," Computer Network and ISDN Systems, pp. 155-162, (1991).

Stockhammer, WD 0.1 of 23001-6 Dynamic Adaptive Streaming over HTTP (DASH), MPEG-4 Systems, International Organisation for Standardisation, ISO/IEC JTC1/SC29/WG11, Coding of Moving Pictures and Audio, MPEG 2010 Geneva/m11398, Jan. 6, 2011, 16 pp.

Sullivan et al., Document: JVT-AA007, "Editors' Draft Revision to ITU-T Rec. H.264|ISO/IEC 14496-10 Advanced Video Coding—In Preparation for ITU-T SG 16 AAP Consent (in integrated form)," Joint Video Team (JVT) of ISO/IEC MPEG & ITU-T VCEG (ISO/IEC JTC1/SC29/WG11 and ITU-T SG16 Q.6), 30th Meeting: Geneva, CH, Jan. 29-Feb. 3, 2009, pp. 1-683, http://wftp3.itu.int/av-arch/jvt-site/2009_01_Geneva/JVT-AD007.zip.

Sun et al., "Seamless Switching of Scalable Video Bitstreams for Efficient Streaming," IEEE Transactions on Multimedia, vol. 6, No. 2, Apr. 2004, pp. 291-303.

Thomas Wiegand, et al., "Joint Draft ITU-T Rec. H.264 | ISO/IEC 14496-10 / Amd.3 Scalable video coding", Joint Video Team (JVT) of ISO/IEC MPEG & ITU-T VCEG (ISO/IEC JTC1/SC29/WG11 and ITU-T SG16 Q.6) 24th Meeting: Geneva, Switzerland, Jun. 29-Jul. 5, 2007, pp. 1-559.

Vetro et al., Document: JVT-AB204 (rev. 1), "Joint Draft 8.0 on Multiview Video Coding," Joint Video Team (JVT) of ISO/IEC MPEG & ITU-T VCEG(ISO/IEC JTC1/SC29/WG11 and ITU-T SG16 Q.6), 28th Meeting: Hannover, DE, Jul. 20-25, 2008, pp. 1-66, http://wftp3.itu.int/av-arch/jvt-site/2008_07_Hannover/JVT-AB204.zip.

Viswanathan, et al., "Metropolitan area video-on-demand services using pyramid broadcasting", Multimedia Systems, 4(4): 197-208 (1996).

Viswanathan, et al., "Pyramid Broadcasting for Video-on-Demand Service", Proceedings of the SPIE Multimedia Computing and Networking Conference, vol. 2417, pp. 66-77 (San Jose, CA, Feb. 1995).

Viswanathan, et al.: "Publishing in Wireless and Wireline Environments," Ph. D Thesis, Rutgers, The State University of New Jersey (Nov. 1994).

(56) References Cited

OTHER PUBLICATIONS

Wenger S., "RTP Payload Format for H.264 Video", Network Working Group, Feb. 2005, pp. 1-84.

Wong, J.W., "Broadcast delivery", Proceedings of the IEEE, 76(12): 1566-1577, (1988).

Yamauchi, Nagamasa. "Application of Lost Packet Recovery by Front Error Correction to Internet Multimedia Transfer" Proceedings of Workshop for Multimedia Communication and Distributed Processing, Japan, Information Processing Society of Japan (IPS), Dec. 6, 2000, vol. 2000, No. 15, pp. 145-150.

Yin et al., "Modified Belief-Propogation algorithm for Decoding of Irregular Low-Density Parity-Check Codes", Electronics Letters, IEE Stevenage, GB, vol. 38, No. 24, Nov. 21, 2002, pp. 1551-1553.

Zorzi, et al.: "On the Statistics of Block Errors in Bursty Channels," IEEE Transactions on Communications, vol. 45, No. 6, Jun. 1997, pp. 660-667.

Wenge et al., "Asymmetric Stereoscopic Video Encoding Algorithm Based on Joint Compensation Prediction," 2009 International Conference on Communications and Mobile Computing, 4 pp.

Marpe et al., "The H.264/MPEG4 Advanced Video Coding Standard and its Applications," Standards Report, IEEE Communications Magazine, Aug. 2006, pp. 134-143.

Hitachi Ltd. et al., "High-Definition Multimedia Interface," Specification Version 1.3a, Nov. 10, 2006, 276 pp.

Hitachi Ltd. et al., "High-Definition Multimedia Interface," Specification Version 1.4, Jun. 5, 2009, 425 pp.

International Telecommunication Union, "ITU-T H.264, Series H: Audiovisual and Multimedia Systems, Infrastructure of audiovisual services—Coding of moving video, Advanced video coding for generic audiovisual services," Mar. 2010, 669 pp.

Chen et al., U.S. Patent Application titled "One-Stream Coding for Asymmetric Stereo Video", filed Feb. 25, 2011.

Chen Y., et al., "Low-Complexity Asymmetric Multiview Video Coding", Multimedia and Expo, 2008 IEEE International Conference on, Jun. 2008, pp. 773-776.

Ono S., et al., "Ubiquitous Technology: High-Efficiency Coding of Moving Images—MEPG-4 and H.264—," 1st edition, Apr. 20, 2005, Ohmsha, Ltd., pp. 124, 125 and 134-136, ISBN: 4-274-20060-4.

Sullivan G.J., et.al., "Draft AVC amendment text to specify Constrained Baseline profile, Stereo High profile, and frame packing SEI message", Jun. 28-Jul. 3, 2009, pp. 1-22, Joint Video Team (JVT) of ISO/IEC MPEG & ITU-T VCEG (ISO/IEC JTC1/SC29/WG11 and ITU-T SG16 Q.6), Document: JVT-AE204, Internet <URL: http://wftp3.itu.int/av-arch/jvt-site/2009_06_London/JVT-AE204.zip>.

Murata, H., et.al., "32.2: A Real-Time 2-D to 3-D Image Conversion Technique Using Computed Image Depth", 1998 SID International Symposium Digest of Technical Papers, vol. 29, Issue 1, May 1998, pp. 919-923, [online], Internet URL: http://radioskot.ru/_fr/2/2Dto3D_conv32_0.pdf.

"Report on Research and Development for Image Production and Display Using Digital Techniques," Mar. 2008, Digital Content Association of Japan, pp. 60-66.

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

International Standard ISO/IEC 14496-12, Information Technology—Coding of audio-visual objects—Part 12: ISO base media file format, Third Edition, Oct. 15, 2008, 120 pp.

ISO/IEC 14496-10:2009/FDAM 1:2009(E): "Information technology—Coding of audio-visual objects—Part 10: Advanced Video Coding, Amendment 1: Constrained baseline profile, stereo high profile and frame packing arrangement SEI message," (MPEG of ISO/IEC JTC 1/SC 29/WG 11, w10707r3), International Organization for Standardization, Geneva, Switzerland, Nov. 30, 2009, pp. 24.

Text of ISO/IEC FDIS 23002-3: "Representation of Auxiliary Video and Supplemental information," ISO/IEC JTC1/SC29/WG11, MPEG Doc, N8768, Marrakech, Morocco, Jan. 2007, pp. 33.

\* cited by examiner

FRAME PACKING FOR ASYMMETRIC STEREO VIDEO

This application claims the benefit of U.S. Provisional Application No. 61/334,253, filed May 13, 2010, U.S. Provisional Application No. 61/366,436, filed Jul. 21, 2010, and U.S. Provisional Application No. 61/433,110, filed on Jan. 14, 2011, each of which is hereby incorporated by reference in its entirety.

CROSS-REFERENCE TO RELATED APPLICATIONS

This application is related to the following co-pending U.S. patent application:
"ONE-STREAM CODING FOR ASYMMETRIC STEREO VIDEO" by Ying Chen et al., having application Ser. No. 13/035,218, filed concurrently herewith, assigned to the assignee hereof, and expressly incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

Efforts have been made to develop new video coding standards based on H.264/AVC. One such standard is the scalable video coding (SVC) standard, which is the scalable extension to H.264/AVC. Another standard is the multi-view video coding (MVC), which has become the multiview extension to H.264/AVC. A joint draft of MVC is in described in JVT-AB204, "Joint Draft 8.0 on Multiview Video Coding," 28th JVT meeting, Hannover, Germany, July 2008, available at http://wftp3.1tu.int/av-arch/jvt-site/2008_07_Hannover/JVT-AB204.zip. A version of the AVC standard is described in JVT-AD007, "Editors' draft revision to ITU-T Rec. H.264|ISO/IEC 14496-10 Advanced Video Coding—in preparation for ITU-T SG 16 AAP Consent (in integrated form)," 30th JVT meeting, Geneva, CH, February 2009," available from http://wftp3.1tu.int/av-arch/jvt-site/2009_01_Geneva/JVT-AD007.zip. The JVT-AD007document integrates SVC and MVC in the AVC specification.

SUMMARY

In general, this disclosure describes techniques for supporting stereo video data, e.g., video data used to produce a three-dimensional (3D) effect. To produce a three-dimensional effect in video, two views of a scene, e.g., a left eye view and a right eye view, are shown simultaneously or nearly simultaneously. The techniques of this disclosure include forming a bitstream having packed frames, where a packed frame corresponds to a single frame having data for two views of a scene. In particular, the techniques of this disclosure include encoding a packed frame having a full resolution frame of one view of a scene and a reduced resolution frame of another view of the scene. The reduced resolution frame may be encoded with respect to a frame of the other view. In this manner, this disclosure also provides techniques for performing inter-view prediction for a reduced resolution frame of a packed frame.

In one example, a method includes receiving a first picture of a first view of a scene having a first resolution, receiving a second picture of a second view of the scene having a reduced resolution relative to the first resolution, forming an asymmetric frame comprising the first resolution picture and the reduced resolution picture, encoding the asymmetric frame, and outputting the asymmetric frame.

In another example, an apparatus for encoding video data includes a video encoder configured to receive a first picture of a first view of a scene having a first resolution, receive a second picture of a second view of the scene having a reduced resolution relative to the first resolution, form an asymmetric frame comprising the first picture and the second picture, and encode the asymmetric frame.

In another example, an apparatus includes means for receiving a first picture of a first view of a scene having a first resolution, means for receiving a second picture of a second view of the scene having a reduced resolution relative to the first resolution, means for forming an asymmetric frame comprising the first picture and the second picture, and means for encoding the asymmetric frame.

In another example, a computer program product includes a computer-readable storage medium having stored thereon instructions that, when executed, cause a processor to receive a first picture of a first view of a scene having a first resolution, receive a second picture of a second view of the scene having a reduced resolution relative to the first resolution, form an asymmetric frame comprising the first picture and the second picture, encode the asymmetric frame, and output the encoded asymmetric frame.

In another example, a method includes receiving an encoded asymmetric frame comprising a first resolution picture of a first view of a scene and a reduced resolution picture of a second view of the scene, wherein the reduced resolution picture has a reduced resolution relative to the first resolution, decoding the asymmetric frame, separating the decoded asymmetric frame into the first resolution picture and the reduced resolution picture, upsampling the reduced resolution picture to produce a second picture of the scene having the first resolution, and outputting the first picture and the second picture, wherein the first picture and the second picture form a stereo image pair.

In another example, an apparatus includes a video decoder configured to receive an encoded asymmetric frame comprising a first resolution picture of a first view of a scene and a reduced resolution picture of a second view of the scene, wherein the reduced resolution picture has a reduced resolution relative to the first resolution, decode the asymmetric frame, separate the decoded asymmetric frame into the first resolution picture and the reduced resolution picture, and upsample the reduced resolution picture to produce a second picture of the scene having the first resolution, wherein the first decoded picture and the second decoded picture form a stereo image pair.

In another example, an apparatus includes means for receiving an asymmetric frame comprising a first resolution picture of a first view of a scene and a reduced resolution picture of a second view of the scene, wherein the reduced resolution picture has a reduced resolution relative to the first resolution, means for decoding the asymmetric frame, means for separating the decoded asymmetric frame into the first resolution picture and the reduced resolution picture, and means for upsampling the reduced resolution picture to produce a second picture of the scene having the first resolution, wherein the first decoded picture and the second decoded picture form a stereo image pair.

In another example, a computer program product includes a computer-readable storage medium having stored thereon instructions that, when executed, cause a processor to receive an asymmetric frame comprising a first resolution picture of a first view of a scene and a reduced resolution picture of a second view of the scene, wherein the reduced resolution picture has a reduced resolution relative to the first resolution, decode the asymmetric frame, separate the decoded asymmetric frame into the first resolution picture and the reduced resolution picture, upsample the reduced resolution picture to produce a second picture of the scene with the first resolution, and output the first picture and the second picture, wherein the first picture and the second picture form a stereo image pair.

In another example, a method includes encoding a first picture of a first view of a scene to produce an encoded picture with a first resolution, encoding at least a portion of a second picture of a second view of the scene relative to a reference picture of the first view to produce an encoded picture with a reduced resolution relative to the first resolution, and outputting the encoded first resolution picture and the encoded reduced resolution picture in a common bitstream.

In another example, an apparatus includes a video encoder configured to encode a first picture of a first view of a scene to produce an encoded picture with a first resolution, encode at least a portion of a second picture of a second view of the scene relative to a reference picture of the first view to produce an encoded picture with a reduced resolution relative to the first resolution, and output the encoded first resolution picture and the encoded reduced resolution picture in a common bitstream.

In another example, an apparatus includes means for encoding a first picture of a first view of a scene to produce an encoded picture with a first resolution, means for encoding at least a portion of a second picture of a second view of the scene relative to a reference picture of the first view to produce an encoded picture with a reduced resolution relative to the first resolution, and means for outputting the encoded first resolution picture and the encoded reduced resolution picture in a common bitstream.

In another example, a computer program product includes a computer-readable storage medium having stored thereon instructions that, when executed, cause a processor to encode a first picture of a first view of a scene to produce an encoded picture with a first resolution, encode at least a portion of a second picture of a second view of the scene relative to a reference picture of the first view to produce an encoded picture with a reduced resolution relative to the first resolution, and output the encoded first resolution picture and the encoded reduced resolution picture in a common bitstream.

In another example, a method includes receiving, from a common bitstream, a first resolution encoded picture of a first view of a scene and a reduced resolution encoded picture of a second view of the scene, wherein the reduced resolution encoded picture has a reduced resolution relative to the first resolution, decoding the first resolution encoded picture to produce a first decoded picture, decoding at least a portion of the reduced resolution encoded picture relative to a reference picture of the first view, upsampling the reduced resolution picture to produce a second decoded picture of the scene with the first resolution, and outputting the first decoded picture and the second decoded picture, wherein the first decoded picture and the second decoded picture form a stereo image pair.

In another example, an apparatus includes a video decoder configured to receive, from a common bitstream, a first resolution encoded picture of a first view of a scene and a reduced resolution encoded picture of a second view of the scene, wherein the reduced resolution encoded picture has a reduced resolution relative to the first resolution, decode the first resolution encoded picture to produce a first decoded picture, decode at least a portion of the reduced resolution encoded picture relative to a reference picture of the first view, upsample the reduced resolution picture to produce a second decoded picture of the scene with the first resolution, and output the first decoded picture and the second decoded picture, wherein the first decoded picture and the second decoded picture form a stereo image pair.

In another example, an apparatus includes means for receiving, from a common bitstream, a first resolution encoded picture of a first view of a scene and a reduced resolution encoded picture of a second view of the scene, wherein the reduced resolution encoded picture has a reduced resolution relative to the first resolution, means for decoding the first resolution encoded picture to produce a first decoded picture, means for decoding at least a portion of the reduced resolution encoded picture relative to a reference picture of the first view, means for upsampling the reduced resolution picture to produce a second decoded picture of the scene with the first resolution, and means for outputting the first decoded picture and the second decoded picture, wherein the first decoded picture and the second decoded picture form a stereo image pair.

In another example, a computer program product includes a computer-readable storage medium having stored thereon instructions that, when executed, cause a processor to receive, from a common bitstream, a first resolution encoded picture of a first view of a scene and a reduced resolution encoded picture of a second view of the scene, decode the first resolution encoded picture to produce a first decoded picture, decode at least a portion of the reduced resolution encoded picture relative to a reference picture of the first view, upsample the reduced resolution picture to produce a second decoded picture of the scene with the first resolution, and output the first decoded picture and the second decoded picture, wherein the first decoded picture and the second decoded picture form a stereo image pair.

The details of one or more examples are set forth in the accompanying drawings and the description below. Other features, objects, and advantages will be apparent from the description and drawings, and from the claims.

DETAILED DESCRIPTION

Figure 1:
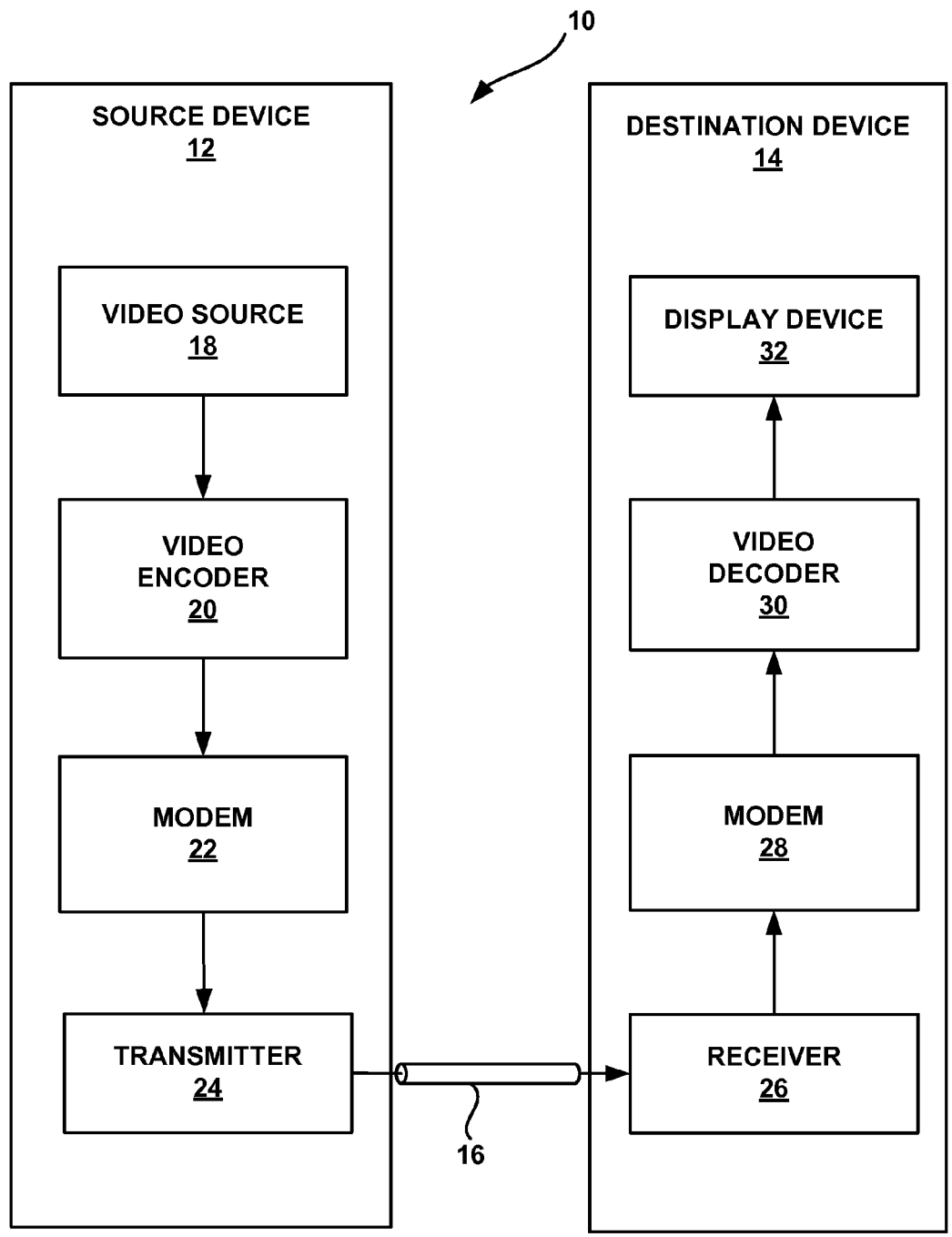
FIG. 1 is a block diagram illustrating an example video encoding and decoding system that may utilize techniques for forming asymmetric packed frames including pictures from two corresponding views of a scene.

In general, this disclosure relates to techniques for supporting stereo video data, e.g., video data used to produce a three-dimensional effect. To produce a three-dimensional effect in video, two views of a scene, e.g., a left eye view and a right eye view, are shown simultaneously or nearly simultaneously. Two pictures of the same scene, corresponding to the left eye view and the right eye view of the scene, may be captured from slightly different horizontal positions, representing the horizontal offset between a viewer's left and right eyes. By displaying these two pictures simultaneously or nearly simultaneously, such that the left eye view picture is perceived by the viewer's left eye and the right eye view picture is perceived by the viewer's right eye, the viewer may experience a three-dimensional video effect.

This disclosure provides techniques for forming a bitstream including packed frames. A packed frame may correspond to a single frame of video data having data for two pictures corresponding to different views of a scene. In particular, the techniques of this disclosure include encoding a packed frame having a full resolution picture of one view of a scene and a reduced resolution picture of another view of the scene. A packed frame including a full resolution picture of a first view of a scene and a reduced resolution picture of a second, different view of the scene may be referred to as an asymmetric packed frame, or simply an asymmetric frame.

In general, the terms "picture" and "frame" may be used interchangeably. This disclosure generally refers to a picture as a sample of a view. This disclosure generally refers to a frame as comprising one or more pictures, which is to be coded as an access unit representing a specific time instance. Accordingly, a frame may correspond to a sample of a view (that is, a single picture) or, in the case of packed frames, include samples from multiple views (that is, two or more pictures).

As an example, two view pictures may be packed as a frame with a top-bottom format. In this example, one view picture may be arranged on top of the other. Each picture may have the same width of w pixels. The full resolution picture may have a height of h pixels, while the reduced resolution picture may have a height of h/2 pixels. As another example, two view pictures may be packed as a frame with a side-by-side format. In this example, the two view pictures may be arranged beside each other. Each picture may have the same height of h pixels. The full resolution picture may have a width of w pixels, while the reduced resolution picture may have a width of w/2 pixels.

Forming asymmetric frames in this manner may provide several advantages. For example, the same bitstream may be sent to devices configured to present three-dimensional video data and to devices that are limited to only two-dimensional video data. The three-dimensional video capable devices may separate the asymmetric frames into constituent views, upsample the reduced resolution view, and display the two views simultaneously or near simultaneously. The two-dimensional video capable devices may remove the reduced resolution view and display only the full resolution view. In this manner, a video content provider, e.g., a network-based server or broadcaster, need only form one bitstream, and devices with varying capabilities may each receive the same bitstream. Moreover, the bitstream may require less bandwidth than a bitstream comprising full resolution pictures of each of two or more views, while introducing negligible subjective quality degradation.

Accordingly, the techniques of this disclosure may support backwards compatibility with legacy devices that are not capable of presenting three-dimensional video data. Unlike devices that can receive and decode symmetric packed frames, which include two sub-sampled pictures, devices receiving asymmetric packed frames in accordance with the techniques of this disclosure may receive a full resolution picture and a reduced resolution picture. Accordingly, the devices need not upsample a picture just to produce a two-dimensional video presentation. Furthermore, a bitstream in accordance with the techniques of this disclosure (e.g., including asymmetric packed frames) may consume less bandwidth than a bitstream having two full resolution pictures for three-dimensional video data.

In some examples, the reduced resolution frame may be encoded with respect to a frame of the other view. That is, an encoder may perform inter-view prediction for reduced resolution pictures of asymmetric packed frames. This disclosure describes techniques for encoding the reduced resolution pictures as fields and using displacement vectors to inter-view encode the reduced resolution pictures. In this manner, this disclosure also provides techniques for performing inter-view prediction for a reduced resolution picture of an asymmetric packed frame. This disclosure further provides frame field interleaved coding techniques, in which pictures of one view may be coded as frames, while pictures of another view may be coded as fields, and the frame pictures and field pictures of the two views may be interleaved in a common bitstream. The pictures of each view may form discrete, independent access units of the same bitstream.

This disclosure also provides techniques for signaling a frame packing type at the network abstraction layer (NAL), e.g., in supplemental enhancement information (SEI) messages of NAL units. Network abstraction layer (NAL) units may include and/or describe coded audio and video data, e.g., using SEI messages. In the example of H.264/AVC (Advanced Video Coding), coded video segments are organized into NAL units, which provide a "network-friendly" video representation addressing applications such as video telephony, storage, broadcast, or streaming. NAL units can be categorized as Video Coding Layer (VCL) NAL units and non-VCL NAL units. VCL units may contain output from the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

In some examples, the techniques of this disclosure may be applied to H.264/AVC codecs or codecs based on advanced video coding (AVC), such as scalable video encoding (SVC), multiview video coding (MVC), or other extensions of H.264/AVC. Such codecs may be configured to recognize SEI messages when the SEI messages are associated with an access unit, where the SEI message may be encapsulated within the access unit in an ISO base media file format or MPEG-2 Systems bitstream. The techniques may also be applied to future coding standards, e.g., H.265/HEVC (high efficiency video coding).

SEI messages may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points.

H.264/AVC provides a frame packing SEI message, which is a codec-level message indicating a frame packing type for a frame including a two pictures, e.g., a left view and a right view of a scene. In this manner, H.264/AVC supports interleaving of two pictures of left view and right view into one picture and coding such pictures into a video sequence. The frame packing SEI message is described in "Information technology—Coding of audio-visual objects—Part 10: Advanced Video Coding, AMENDMENT 1: Constrained baseline profile, stereo high profile and frame packing arrangement SEI message," N10703, MPEG of ISO/IEC JTC1/SC29/WG11, Xian, China, October 2009, which is incorporated into the most recent version of the H.264/AVC standard.

In this SEI message, various types of frame packing methods are supported for spatial interleaving of two frames. The supported interleaving methods include checkerboard, column interleaving, row interleaving, side-by-side, top-bottom, and side-by-side with checkerboard upconversion. This disclosure provides techniques for supporting additional frame packing types, such as asymmetric frame packing arrangements. In particular, this disclosure provides a modified frame packing SEI message that indicates whether asymmetric packing is enabled for a particular frame, and if so, whether the asymmetric frame is packed top-bottom or side-by-side. For example, the frame packing SEI message may indicate whether the pictures for the two views in the same frame are arranged with the reduced resolution picture below the full resolution picture or to the right of the full resolution picture in the frame. A decoder may use this information to determine whether the frame is an asymmetric frame and to properly separate the asymmetric frame into constituent pictures of the two views.

This disclosure includes techniques for signaling whether a frame is an asymmetric packed frame in an SEI message, in some examples, e.g., with respect to H.264/AVC. As one example, an encoder may signal that a frame is an asymmetric packed frame in an independent SEI message. As another example, an encoder may signal that a frame is an asymmetric packed frame in a modified version of the frame packing arrangement SEI message. The encoder may also signal, in video usability information (VUI), an aspect ratio for the asymmetric packed frame to indicate a packing arrangement for the asymmetric packed frame. For example, the encoder may signal an aspect ratio of 4:3 (or one of the unspecified values of Table E-1 of the H.264/AVC specification) to indicate a side-by-side packing arrangement. As another example, the encoder may signal an aspect ratio of 3:4 (or, again, one of the unspecified values of Table E-1 of the H.264/AVC specification) to indicate a top-bottom packing arrangement.

It should be understood that methods for sub-sampling and up-sampling of the reduced resolution picture are not limited to any particular techniques. For purposes of example, this disclosure generally describes horizontal or vertical down-sampling and upsampling. However, quincunx (that is, checkerboard) sampling may also be used.

In addition, this disclosure provides techniques for transferring a bitstream including asymmetric packed frames over a high definition multimedia interface (HDMI). In this manner, this disclosure provides techniques by which a three-dimensional video interface, such as HDMI, may accept view images with asymmetric packing in one or more frames.

FIG. 1 is a block diagram illustrating an example video encoding and decoding system 10 that may utilize techniques for forming asymmetric packed frames including pictures from two corresponding views of a scene. As shown in FIG. 1, system 10 includes a source device 12 that transmits encoded video to a destination device 14 via a communication channel 16. Source device 12 and destination device 14 may comprise any of a wide range of devices, such as fixed or mobile computing devices, set-top boxes, gaming consoles, digital media players, or the like. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless.

The techniques of this disclosure, however, which concern forming asymmetric packed frames, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless or wired media suitable for transmission of encoded video data.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 may be configured to apply the techniques for forming a bitstream including asymmetric packed frames, e.g., frames including coded data for two pictures, each from a different view of a scene, where one of the pictures has full resolution and the other picture has a reduced resolution, e.g., one-half of the resolution of the full resolution frame. Moreover, video encoder 20 may be configured to inter-view encode the reduced resolution frame. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for producing asymmetric packed frames and splitting asymmetric packed frames into constituent views may be performed by any digital video encoding and/or decoding device. Although generally the techniques of this disclosure are performed by a video encoding device, the techniques may also be performed by a video encoder/decoder, typically referred to as a "CODEC." Moreover, aspects of the techniques of this disclosure may also be performed by a video preprocessor or video postprocessor, such as a file encapsulation unit, file decapsulation unit, video multiplexer, or video demultiplexer. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, video gaming, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications executed by mobile or generally non-mobile computing devices. In any case, the captured, pre-captured, or computer-generated video may be encoded by video encoder 20.

Video source 18 may provide pictures from two or more views to video encoder 20. Two pictures of the same scene may be captured simultaneously or nearly simultaneously from slightly different horizontal positions, such that the two pictures can be used to produce a three-dimensional effect. Alternatively, video source 18 (or another unit of source device 12) may use depth information or disparity information to generate a second picture of a second view from a first picture of a first view. The depth or disparity information may be determined by a camera capturing the first view, or may be calculated from data in the first view.

MPEG-C part-3 provides a specified format for including a depth map for a picture in a video stream. The specification is described in "Text of ISO/IEC FDIS 23002-3 Representation of Auxiliary Video and Supplemental Information," ISO/IEC JTC 1/SC 29/WG 11, MPEG Doc, N8768, Marrakech, Morocoo, January 2007. In MPEG-C part 3, auxiliary video can be a depth map or a parallax map. When representing a depth map, MPEG-C part-3 may provide flexibilities, in terms of number of bits used to represent each depth value and resolution of depth map. For example, the map may be one-quarter of the width and one-half of the height of the image described by the map. The map may be coded as a monochromatic video sample, e.g., within an H.264/AVC bitstream with only the luminance component. Alternatively, the map may be coded as auxiliary video data, as defined in H.264/AVC. In the context of this disclosure, a depth map or a parallax map may have the same resolution as the primary video data. Although the H.264/AVC specification does not currently specify the usage of auxiliary video data to code depth map the techniques of this disclosure may be used in conjunction with techniques for using such a depth map or parallax map.

The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein to form an asymmetric packed frame having a full resolution picture of one view and a reduced resolution picture of another view.

The information communicated over channel 16 may include syntax information defined by video encoder 20, which is also used by video decoder 30, that includes syntax elements that describe characteristics and/or processing of macroblocks and other coded units, e.g., GOPs. Accordingly, video decoder 30 may unpack the asymmetric packed frame into constituent pictures of the views, decode the pictures, and upsample the reduced resolution picture to the full resolution. Display device 32 may display the decoded pictures to a user.

Display device 32 may comprise any of a variety of display devices such as a cathode ray tube (CRT), a liquid crystal display (LCD), a plasma display, an organic light emitting diode (OLED) display, or another type of display device. Display device 32 may display the two pictures from the asymmetric packed frame simultaneously or nearly simultaneously. For example, display device 32 may comprise a stereoscopic three-dimensional display device capable of displaying two views simultaneously or nearly simultaneously.

A user may wear active glasses to rapidly and alternatively shutter left and right lenses, such that display device 32 may rapidly switch between the left and the right view in synchronization with the active glasses. Alternatively, display device 32 may display the two views simultaneously, and the user may wear passive glasses (e.g., with polarized lenses) which filter the views to cause the proper views to pass through to the user's eyes. As still another example, display device 32 may comprise an autostereoscopic display, for which no glasses are needed.

In some examples, modem 28 and video decoder 30 may be included in separate devices. The separate devices may be coupled by a high definition multimedia interface (HDMI). This disclosure, in some examples, proposes modifying HDMI to support transfer of asymmetric packed frames. HDMI provides three-dimensional video formats in Appendix H of version 1.4 of the HDMI specification, which is available at. This specification supports various formats for packing three-dimensional video data into one frame, e.g., in the 3D_Structure field. In accordance with the techniques of this disclosure, devices may exchange asymmetric packed frames via HDMI, in addition to those packing arrangements already provided by HDMI version 1.4.

As an example, the 3D_Structure field may include a value indicating that a frame has a frame packing format, which is similar to a top-bottom arrangement in H.264/AVC, but without sub-sampling. There may be some blank area in a frame having a frame packing format for HDMI. As another example, the 3D_Structure field may include a value indicating that a frame has a field alternative format, which indicates that a left-view image and a right-view image are fields of the corresponding frame. As another example, the 3D_Structure field may include a value indicating that a frame has a side-by-side full format, indicating that the views are arranged side-by-side and not sub-sampled.

As still another example, the 3D_Structure field may include a value indicating that a frame has a side-by-side half format, indicating that the views are sub-sampled with a half horizontal resolution, and are arranged side-by-side. When the side-by-side half format is enabled, subsampling and position information may also be signaled, e.g., in a 3D_Ext_Data field. The frame may support two types of sub-sampling: horizontal sub-sampling or quincunx (e.g., checkerboard) matrix. The position information may provide data indicating a phase shift of the sub-sampled left and right views. HDMI also supports texture image plus depth image information, as well as video content with graphics representation.

As noted above, the techniques of this disclosure include modifying HDMI to support asymmetric packed frames. For example, in accordance with this disclosure, a device may set a value for a 3D_Structure field of HDMI data to indicate that a frame is an asymmetric packed frame. The 3D_Structure field may include a value indicating that a frame includes a full resolution picture and a reduced resolution picture that form a stereo pair, and indicating that the pictures are arranged side-by-side or top-bottom.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the ITU-T H.264 standard, alternatively referred to as MPEG-4, Part 10, Advanced Video Coding (AVC). The techniques of this disclosure, however, are not limited to any particular coding standard. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. A video block may correspond to a macroblock or a partition of a macroblock. The video blocks may have fixed or varying sizes, and may differ in size according to a specified coding standard. Each video frame may include a plurality of slices. Each slice may include a plurality of macroblocks, which may be arranged into partitions, also referred to as sub-blocks.

As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Block sizes that are less than 16 by 16 may be referred to as partitions of a 16 by 16 macroblock. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" or "coding unit" may refer to any independently decodable unit of a video frame such as an entire frame, a slice of a frame, a group of pictures (GOP) also referred to as a sequence, or another independently decodable unit defined according to applicable coding techniques.

In accordance with the techniques of this disclosure, video encoder 20 may form asymmetric packed frames from received video data of two views. That is, video encoder 20 may receive raw image data of two views from, e.g., video source 18. In general, the two views may include a sequence of pictures, such that for each picture of one view, there exists a picture of the other view that forms a stereo pair with the picture of the first view. A stereo pair generally corresponds to two pictures that, when displayed simultaneously or nearly simultaneously, produce a three-dimensional video effect. Pictures that form a stereo pair may include descriptive data, such as timestamps, to indicate a corresponding picture of another view with which a current picture forms a stereo pair.

In any case, video encoder 20 may encode a picture of a first view normally, e.g., in accordance with ITU-T H.264/AVC encoding standards or with another encoding standard such as MPEG-2, MPEG-4, H.265, or the like. Video encoder 20, or a video preprocessing unit of source device 12 (which may comprise a processor, processing unit, ASIC, DSP, FPGA, or other processing circuitry coupled between video source 18 and video encoder 20), may spatially downsample a picture of a second view that forms a stereo pair with the encoded picture of the first view. Spatial downsampling may comprise reducing spatial resolutions, e.g., by reducing vertical and/or horizontal pixel resolution. In one example, video encoder 20 may reduce the vertical pixel resolution of the picture by one-half.

Video encoder 20 may then encode the reduced resolution picture of the other view. In some examples, video encoder 20 may encode the reduced resolution picture in an intra-prediction mode (e.g., as an I-Picture) or in an inter-prediction mode (e.g., as a P-Picture or a B-Picture). In this manner, video encoder 20 may encode the reduced resolution picture relative to other pictures in the same view that occur earlier (in decoding-time order) in a bitstream produced by video encoder 20. In some examples, video encoder 20 may implement inter-view prediction, in which video encoder 20 may encode the reduced resolution view relative to pictures of the view including the full resolution picture. For example, video encoder 20 may encode the reduced resolution view picture relative to previously encoded pictures of the view including the full resolution encoded picture. Video encoder 20 may encode the reduced resolution view picture relative to the full resolution picture of the same packed frame, or of previously coded frames.

As one example, video encoder 20 may encode the reduced resolution picture as a field. Techniques for interlaced video data coding may be employed to encode the reduced resolution picture as a field, in which case horizontal rows of pixels of the reduced resolution picture may be predicted from alternate rows of pixels of a full resolution picture. That is, video encoder 20 may encode the reduced resolution picture as either a top field or a bottom field. In some examples, video encoder 20 may output the full resolution picture of one view as an access unit and a corresponding reduced resolution picture of a different view as a separate access unit. Thus, video encoder 20 need not necessarily combine the two pictures into an asymmetric frame to perform techniques for combining data for two views into a single, common bitstream.

As another example, video encoder 20 may encode the reduced resolution picture using displacement vectors. The displacement vectors may be relative to reduced resolution pictures in the same view or full resolution pictures in the view including full resolution pictures. When the displacement vector refers to a full resolution picture, video encoder 20 may account for the position of the reduced resolution picture in the asymmetric frame. Suppose, for example, that the asymmetric packed frame includes the pictures in a top-bottom arrangement with the reduced resolution picture below the full resolution picture in the frame. Video encoder 20 may modify a vertical component of the displacement vector by subtracting the height of the full resolution picture from the vertical component and multiplying the resulting difference by two, assuming that the reduced resolution picture has one-half the resolution of the full resolution picture.

Following intra-predictive or inter-predictive coding to produce predictive data and residual data, and following any transforms (such as the 4×4 or 8×8 integer transform used in H.264/AVC or a discrete cosine transform DCT) applied to residual data to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Following quantization, entropy coding of the quantized data may be performed, e.g., according to content adaptive variable length coding (CAVLC), context adaptive binary arithmetic coding (CABAC), or another entropy coding methodology. A processing unit configured for entropy coding, or another processing unit, may perform other processing functions, such as zero run length coding of quantized coefficients and/or generation of syntax information such as coded block pattern (CBP) values, macroblock type, coding mode, maximum macroblock size for a coded unit (such as a frame, slice, macroblock, or sequence), or the like.

Video encoder 20 may further send syntax data, such as block-based syntax data, frame-based syntax data, and/or GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame. Video decoder 30 may therefore comprise a standard video decoder and need not necessarily be specially configured to effect or utilize the techniques of this disclosure.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, a computing device, and/or a wireless communication device, such as a mobile telephone.

Video decoder 30 may be configured to receive a bitstream including asymmetric packed frames. Video decoder 30 may further be configured to unpack such a frame into corresponding pictures, e.g., a full resolution picture of one view and a reduced resolution picture of another view. Video decoder 30 may decode the pictures and upsample (e.g., through interpolation) the reduced resolution picture to produce two decoded, full resolution pictures. In some examples, video decoder 30 may decode the reduced resolution picture with reference to a decoded picture from the view corresponding to the full resolution picture. That is, video decoder 30 may also support inter-view prediction.

In some examples, video decoder 30 may be configured to determine whether destination device 14 is capable of decoding and displaying three-dimensional data. If not, video decoder 30 may unpack a received asymmetric packed frame, but discard the reduced resolution picture. Video decoder 30 may decode the full resolution picture and other pictures of the same view, and cause video display 32 to display the pictures from this view to present two-dimensional video data. Thus, video decoder 30 may decode the full resolution picture and provide the decoded full resolution picture to display device 32, without attempting to decode the reduced resolution picture.

In this manner, whether or not destination device 14 is capable of displaying three-dimensional video data, destination device 14 may receive a bitstream including asymmetric packed frames. Thus, various destination devices with various decoding and rendering capabilities may be configured to receive the same bitstream from source device 20. That is, some destination devices may be capable of decoding and rendering three-dimensional video data while others may not be capable of decoding and/or rendering three-dimensional video data, yet each of the devices may be configured to receive and use data from the same bitstream including asymmetric packed frames.

Figure 2:
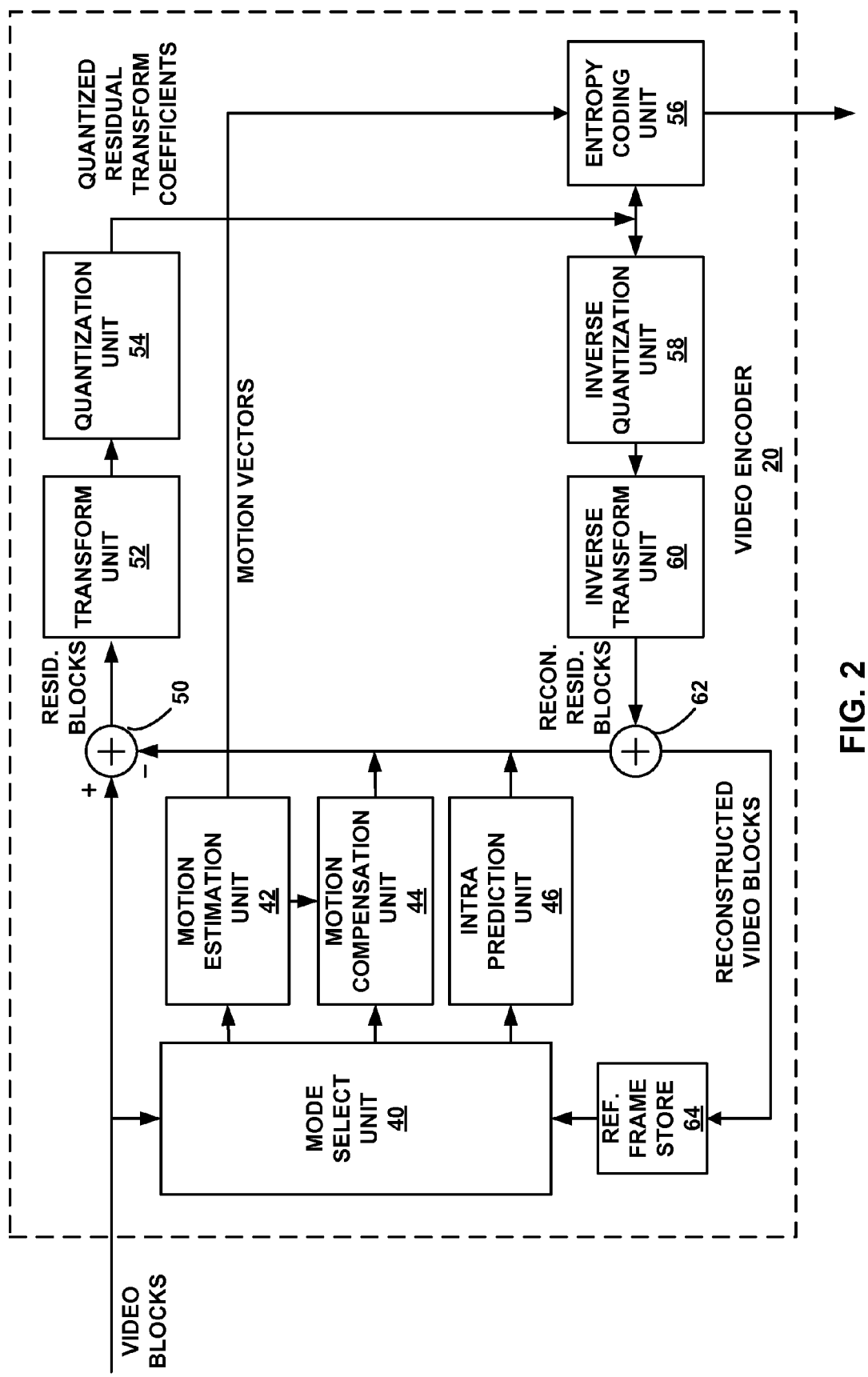
FIG. 2 is a block diagram illustrating an example of a video encoder that may implement techniques for producing asymmetric packed frames.

FIG. 2 is a block diagram illustrating an example of video encoder 20 that may implement techniques for producing asymmetric packed frames. Video encoder 20 may perform intra- and inter-coding of blocks within video frames, including macroblocks, or partitions or sub-partitions of macroblocks. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes and inter-modes such as uni-directional prediction (P-mode) or bi-directional prediction (B-mode) may refer to any of several temporal-based compression modes. Video encoder 20 may also, in some examples, be configured to perform inter-view prediction of reduced resolution pictures in an asymmetric packed frame.

As shown in FIG. 2, video encoder 20 receives a current video block within a video picture to be encoded. In the example of FIG. 2, video encoder 20 includes motion compensation unit 44, motion estimation unit 42, reference frame store 64, summer 50, transform unit 52, quantization unit 54, and entropy coding unit 56. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62.

During the encoding process, video encoder 20 receives a video picture or slice to be coded. The picture or slice may be divided into multiple video blocks. Motion estimation unit 42 and motion compensation unit 44 perform inter-predictive coding of the received video block relative to one or more blocks in one or more reference frames to provide temporal compression. Intra prediction unit 46 may perform intra-predictive coding of the received video block relative to one or more neighboring blocks in the same frame or slice as the block to be coded to provide spatial compression. Mode select unit 40 may select one of the coding modes, intra or inter, e.g., based on error results, and provides the resulting intra- or inter-coded block to summer 50 to generate residual block data and to summer 62 to reconstruct the encoded block for use in a reference frame.

In particular, video encoder 20 may receive pictures from two views forming a stereo view pair. The two views may be referred to as view 0 and view 1. Without loss of generality, assume that view 0 is a left eye view and view 1 is a right eye view. It should be understood that the views may be labeled differently, and that instead, view 1 may correspond to the left eye view and view 0 may correspond to the right eye view. In one example, video encoder 20 may encode pictures of view 0 at a full resolution and pictures of view 1 at a reduced resolution. Video encoder 20 may downsample pictures of view 1 by a factor of one-half in the horizontal or the vertical direction.

Video encoder 20 may further pack the encoded pictures into an asymmetric packed frame. Assume, for example, that video encoder 20 receives a view 0 picture and a view 1 picture, each having a height of h pixels and a width of w pixels, where w and h are non-negative, non-zero integers. Video encoder 20 may form a top-bottom arranged asymmetric packed frame by downsampling the height of the view 1 picture. For example, following downsampling and encoding of the view 1 picture, the encoded, downsampled view 1 picture may have a height of h/2 pixels and a width of w pixels. Video encoder 20 may then form an asymmetric packed frame including the encoded view 0 picture and the encoded, downsampled view 1 picture below the encoded view 0 picture, such that the asymmetric frame has a height of 3/2 h pixels and a width of w pixels.

As another example, video encoder 20 may form a side-by-side arranged asymmetric packed frame by downsampling the view 1 picture. For example, following downsampling and encoding of the view 1 picture, the view 1 picture may have a width of w/2 pixels and a height of h pixels. Video encoder 20 may then form an asymmetric packed frame including the encoded view 0 picture and the encoded, downsampled view 1 picture to the right of the encoded view 0 picture, such that the asymmetric frame has a height of h pixels and a width of 3/2 w pixels.

Video encoder 20 may further provide information indicating a packing arrangement for an asymmetric packed frame. The information may indicate whether the frame is an asymmetric packed frame, and if so, whether the packing arrangement is side-by-side or top-bottom. As one example, video encoder 20 may provide this information in the form of a frame packing arrangement SEI message. The frame packing arrangement SEI message may be defined according to the example data structure of Table 1, below:

TABLE 1 frame_packing_arrangement SEI message

| frame_packing_arrangement( payloadSize ) { | C | Descriptor |
|---|---|---|
|   frame_packing_arrangement_id | 5 | ue(v) |
|   frame_packing_arrangement_cancel_flag | 5 | u(1) |
|   if( !frame_packing_arrangement_cancel_flag ) { | | |
|     asymmetric_packing_idc | 5 | u(2) |
|     frame_packing_arrangement_type | 5 | u(5) |
|     quincunx_sampling_flag | 5 | u(1) |
|     content_interpretation_type | 5 | u(6) |
|     spatial_flipping_flag | 5 | u(1) |
|     frame0_flipped_flag | 5 | u(1) |
|     field_views_flag | 5 | u(1) |
|     current_frame_is_frame0_flag | 5 | u(1) |
|     frame0_self_contained_flag | 5 | u(1) |
|     frame1_self_contained_flag | 5 | u(1) |
|     If(!quincunx_sampling_flag && | | |
|       frame_packing_arrangement_type !=5 ) { | | |
|       frame0_grid_position_x | 5 | u(4) |
|       frame0_grid_position_y | 5 | u(4) |
|       frame1_grid_position_x | 5 | u(4) |
|       frame1_grid_position_y | 5 | u(4) |
|     } | | |
|     frame_packing_arrangement_reserved_byte | 5 | u(8) |
|     frame_packing_arrangement_repetition_period | 5 | ue(v) |
|   } | | |
|   frame_packing_arrangement_extension_flag | 5 | u(1) |
| } | | |

The frame packing arrangement SEI message may inform a video decoder, such as video decoder 30, that the output decoded picture contains samples of a frame consisting of multiple distinct spatially packed constituent frames using an indicated frame packing arrangement scheme. In accordance with the techniques of this disclosure, the frame may comprise an asymmetric packed frame. The information of the SEI message can be used by the decoder to rearrange the samples and process the samples of the constituent frames appropriately for display or other purposes. This SEI message may be associated with pictures that are either frames or fields. The frame packing arrangement of the samples may be specified in terms of the sampling structure of a frame in order to define a frame packing arrangement structure that is invariant with respect to whether a picture is a single field of such a packed frame or is a complete packed frame.

Video encoder 20 may set frame_packing_arrangement_id to a value containing an identifying number that may be used to identify the usage of the frame packing arrangement SEI message. Video encoder 20 may set value of frame_packing_arrangement_id in the range of 0 to $2^{32}-2$, inclusive. Values of frame_packing_arrangement_id from 0 to 255 and from 512 to $2^{31}-1$ may be used as determined by video encoder 20. Values of frame_packing_arrangement_id from 256 to 511 and from $2^{31}$ to $2^{32}-2$ may be reserved for future use by ITU-T|ISO/IEC. Video decoders may ignore (e.g., remove from the bitstream and discard) all frame packing arrangement SEI messages containing a value of frame_packing_arrangement_id in the range of 256 to 511 or in the range of $2^{31}$ to $2^{32}-2$.

Video encoder 20 may set the value of frame_packing_arrangement_cancel_flag equal to 1 to indicate that the frame packing arrangement SEI message cancels the persistence of any previous frame packing arrangement SEI message in output order. Video encoder 20 may set the value of frame_packing_arrangement_cancel_flag equal to 0 to indicate that frame packing arrangement information follows.

Video encoder 20 may set the value of asymmetric_packing_idc (asymmetric packing indicator) to indicate a type of asymmetric coding. For example, video encoder 20 may set asymmetric_packing_idc to a value of 0 to indicate that two constituent frames have the same resolution, that is, that the corresponding frame is not an asymmetric packed frame. Video encoder 20 may set the value of asymmetric_packing_idc larger than 0 (e.g., 1 or 2) to indicate that two constituent frames have with different resolutions. For example, one of the frames may be one-half of the other.

In one example, video encoder 20 may set the value of asymmetric_packing_idc equal to 1 to indicate that two constituent frames have different resolutions, and that frame 1 has a half resolution of frame 0. In one example, video encoder 20 may set the value of asymmetric_packing_idc equal to 2 to indicate that two constituent frames have different resolutions, and that frame 0 has a half resolution of frame 1. The value 3 for asymmetric_packing_idc is currently unspecified and reserved for future use. Table 2 below provides one example for interpreting the value of asymmetric_packing_idc:

TABLE 2 asymmetric_packing_idc

| Value | Example Interpretation |
|---|---|
| 0 | Frame 0 and frame 1 have the same resolution |
| 1 | Indicates frame 1 being half resolution of frame 0: when the frame_packing_arrangement_type is 3, frame 1 has the same height as frame 0 and frame 1 has a half width of frame 0; when the frame_packing_arrangement_type is 4, frame 1 has the same width as frame 0 and frame 1 has a half height of frame 0. |
| 2 | Indicates frame 0 being half resolution of frame 1: when the frame_packing_arrangement_type is 3, frame 0 has the same height as frame 1 and frame 0 has a half width of frame 1, when the frame_packing_arrangement_type is 4, frame 0 has the same width as frame 1 and frame 0 has a half height of frame 1. |

Video encoder 20 may set the value of frame_packing_arrangement_type to indicate the type of packing arrangement of the frames as specified in Table 3, below. When video encoder 20 sets the value of asymmetric_packing_idc to a value larger than 0 (e.g., 1 or 2), video encoder 20 may set the value of frame_packing_arrangement_type to either 6, 7, 8, or 9.

TABLE 3 frame_packing_arrangement_type

| Value | Example Interpretation |
|---|---|
| 0 | Each component plane of the decoded frames contains a "checkerboard" based interleaving of corresponding planes of two constituent frames. |
| 1 | Each component plane of the decoded frames contains a column based interleaving of corresponding planes of two constituent frames. |

TABLE 3-continued frame_packing_arrangement_type

Figure 4:
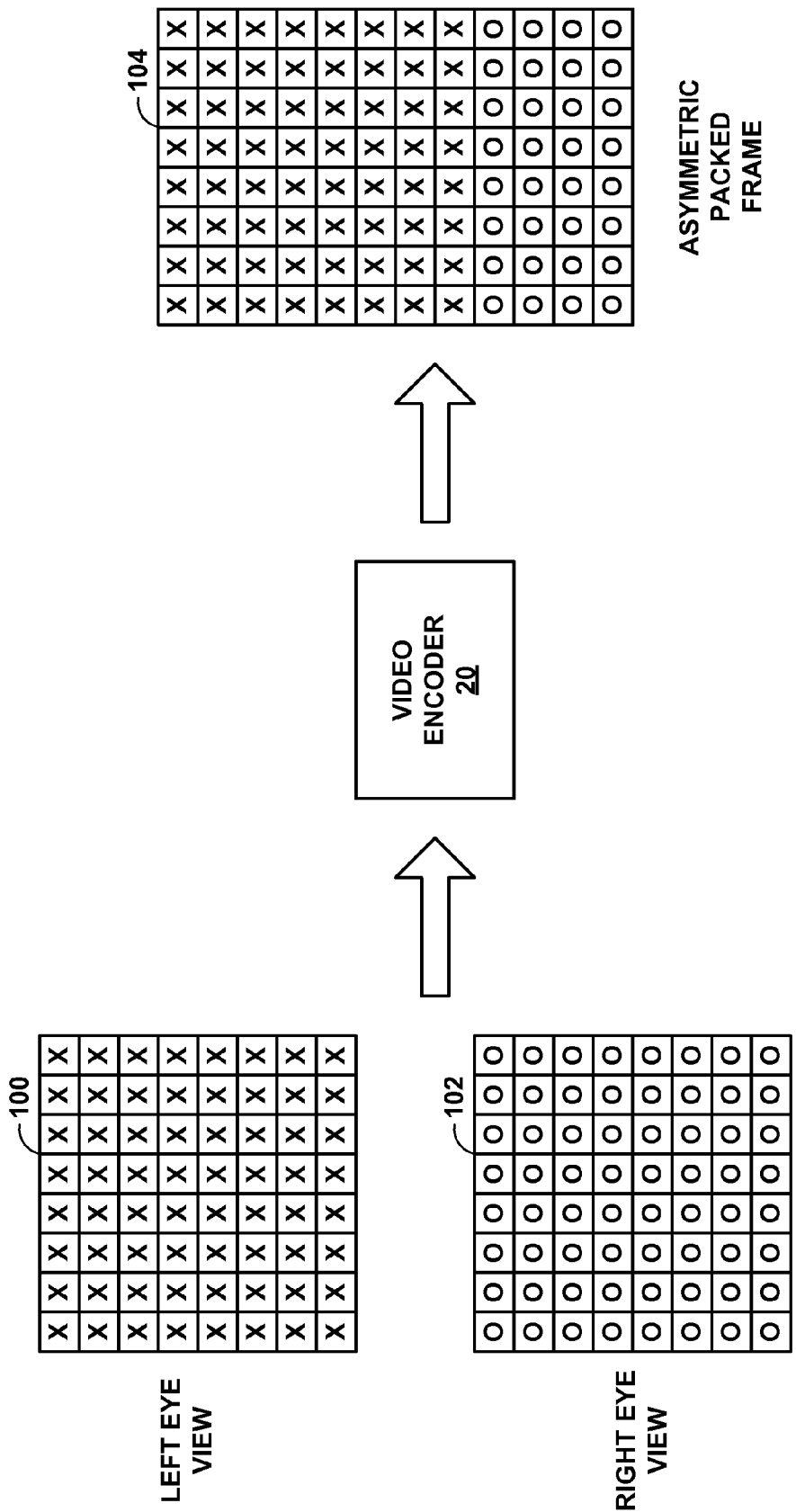
FIG. 4 is a conceptual diagram illustrating pictures of a left eye view and a right eye view being combined by a video encoder to form an asymmetric packed frame having a top-bottom frame packing arrangement.
Figure 5:
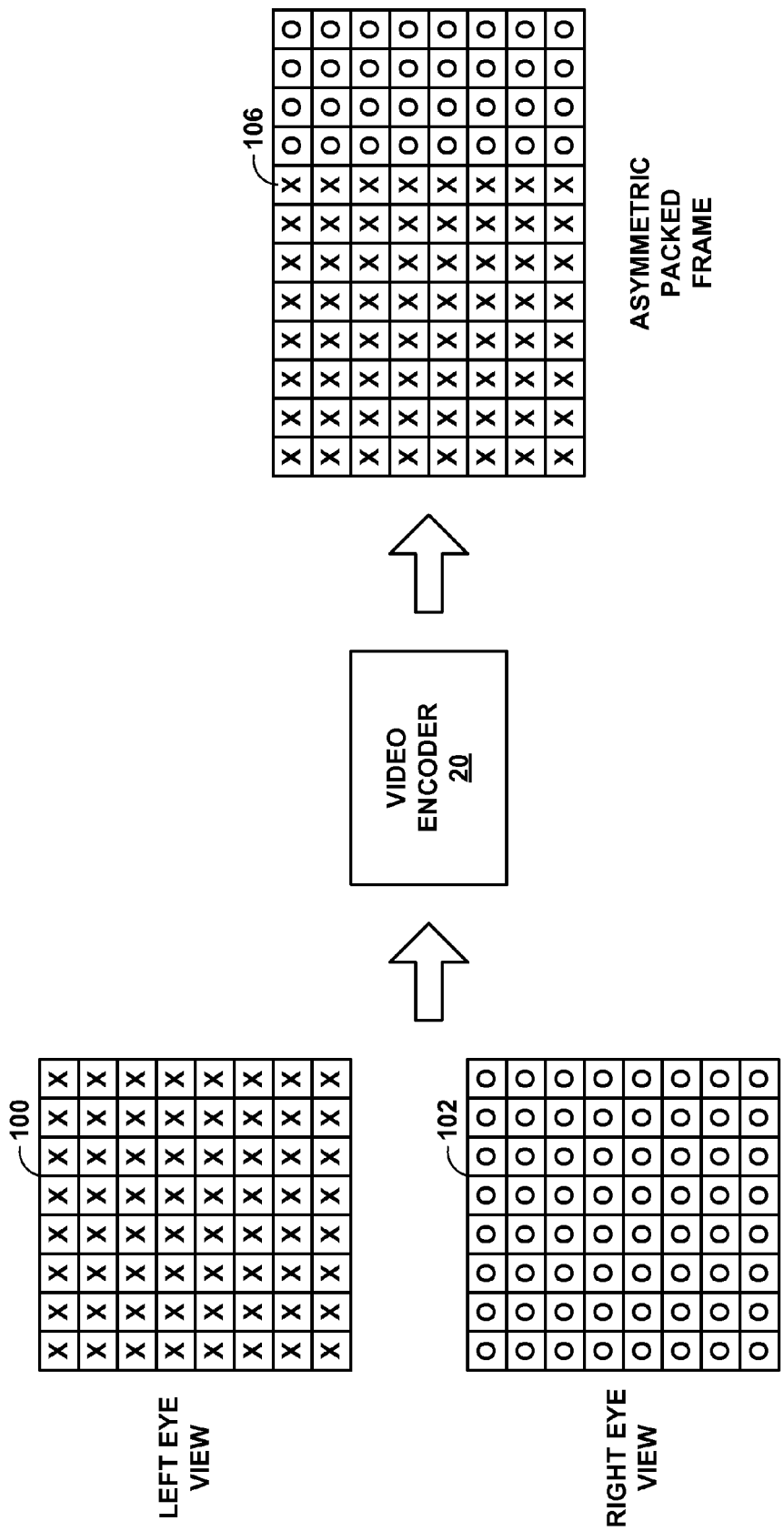
FIG. 5 is a conceptual diagram illustrating pictures of a left eye view and a right eye view being combined by a video encoder to form an asymmetric packed frame having a side-by-side frame packing arrangement.

| Value | Example Interpretation |
|---|---|
| 2 | Each component plane of the decoded frames contains a row based interleaving of corresponding planes of two constituent frames. |
| 3 | Each component plane of the decoded frames contains a side-by-side packing arrangement of corresponding planes of two constituent frames. |
| 4 | Each component plane of the decoded frames contains top-bottom packing arrangement of corresponding planes of two constituent frames. |
| 5 | The component planes of the decoded frames in output order form a temporal interleaving of alternating first and second constituent frames. |
| 6, 7 | Each component plane of the decoded frames contains side-by-side packing arrangement of corresponding planes of two constituent frames as illustrated in FIG. 5, wherein only the bottom frame needs upconversion (in this example). Frame 0 and frame 1 have the same height. This value equal to 6 indicates that frame 1 has a half width of frame 0; this value equal to 7 indicates that frame 0 has a half width of frame 1. |
| 8, 9 | Each component plane of the decoded frames contains a top-bottom packing arrangement of corresponding planes of two constituent frames as illustrated in FIG. 4, wherein only the right frame needs upconversion (in this example). Frame 0 and frame 1 have the same width. This value equal to 8 indicates that frame 1 has a half height of frame 0; this value equal to 9 indicates that frame 0 has a half height of frame 1. |

Video encoder 20 may set the value of quincunx_sampling_flag equal to 1 to indicate that each color component plane of each constituent frame is quincunx sampled. Video encoder 20 may set the value of quincunx_sampling_flag equal to 0 to indicate that the color component planes of each constituent frame are not quincunx sampled. When video encoder 20 sets the value of frame_packing_arrangement_type is equal to 0, video encoder 20 may also set the value of quincunx_sampling_flag equal to 1. When video encoder 20 sets the value of frame_packing_arrangement_type equal to 5, video encoder 20 may also set the value of quincunx_sampling_flag equal to 0.

Video encoder 20 may set the value of content_interpretation_type to indicate the intended interpretation of the constituent frames as specified in Table 4. Values of content_interpretation_type that do not appear in Table 4 may be reserved for future specification by ITU-T|ISO/IEC. For each specified frame packing arrangement scheme, there may be two constituent frames (pictures), referred to in Table 4 as frame 0 and frame 1.

TABLE 4 content_interpretation_type

| Value | Example Interpretation |
|---|---|
| 0 | Unspecified relationship between the frame packed constituent frames |
| 1 | Indicates that the two constituent frames form the left and right views of a stereo view scene, with frame 0 being associated with the left view and frame 1 being associated with the right view |
| 2 | Indicates that the two constituent frames form the right and left views of a stereo view scene, with frame 0 being associated with the right view and frame 1 being associated with the left view |

Video encoder 20 may set the value of spatial_flipping_flag equal to 1 when the value of frame_packing_arrangement_type is equal to 3 or 4, to indicate that one of the two constituent frames is spatially flipped relative to its intended orientation for display or other such purposes. When frame_packing_arrangement_type is equal to 3 or 4 and spatial_flipping_flag is equal to 1, the type of spatial flipping that is indicated may be as follows. If frame_packing_arrangement_type is equal to 3, the indicated spatial flipping is horizontal flipping. Otherwise (that is, when the value of frame_packing_arrangement_type is equal to 4), the indicated spatial flipping is vertical flipping.

When frame_packing_arrangement_type is not equal to 3 or 4, video encoder 20 may set the value of spatial_flipping_flag equal to 0. When frame_packing_arrangement_type is not equal to 3 or 4, the value 1 for frame_packing_arrangement_type may be reserved for future use by ITU-T|ISO/IEC. When frame_packing_arrangement_type is not equal to 3 or 4, video decoders may ignore the value 1 for spatial_flipping_flag.

Video encoder 20 may set the value of frame0_flipped_flag equal to 1 to indicate which one of the two constituent frames is flipped. When spatial_flipping_flag is equal to 1, video encoder 20 may set the value of frame0_flipped_flag equal to 0 to indicate that frame 0 is not spatially flipped and frame 1 is spatially flipped, or video encoder 20 may set the value of frame0_flipped_flag equal to 1 to indicate that frame 0 is spatially flipped and frame 1 is not spatially flipped.

When video encoder 20 sets the value of spatial_flipping_flag equal to 0, video encoder 20 may set the value of frame0_flipped_flag equal to 0. When video encoder 20 sets the value of spatial_flipping_flag is equal to 0, the value 1 for spatial_flipping_flag may be reserved for future use by ITU-T|ISO/IEC. When spatial_flipping_flag is equal to 0, video decoders may ignore the value of frame0_flipped_flag.

When video encoder 20 sets the value of quincunx_sampling_flag equal to 0, video encoder 20 may provide spatial location reference information to specify the location of the upper left luma sample of each constituent frame relative to a spatial reference point. Video encoder 20 may indicate the location of chroma samples relative to luma samples by the chroma_sample_loc_type_top_field and chroma_sample_loc_type_bottom_field syntax elements in video usability information (VUI) parameters.

Video encoder 20 may set the value of field_views_flag equal to 1 to indicate that all pictures in the current coded video sequence are coded as complementary field pairs. All fields of a particular parity may be considered a first constituent frame and all fields of the opposite parity may be considered a second constituent frame. When video encoder 20 does not set the value of frame_packing_arrangement_type equal to 2, video encoder 20 may set the value of field_views_flag equal to 0. When video encoder 20 does not set the value of frame_packing_arrangement_type equal to 2, the value 1 for field_views_flag may be reserved for future use by ITU-T|ISO/IEC. When frame_packing_arrangement_type is not equal to 2, video decoders may ignore the value of field_views_flag.

Video encoder 20 may set the value of current_frame_is_frame0_flag equal to 1, when frame_packing_arrangement is equal to 5, to indicate that the current decoded frame is constituent frame 0 and the next decoded frame in output order is constituent frame 1, and the display time of the constituent frame 0 should be delayed to coincide with the display time of constituent frame 1. Accordingly, a video decoder, such as video decoder 30, may delay the display time of constituent frame 0 to coincide with the display time of constituent frame 1. Video encoder 20 may set the value of current_frame_is_frame0_flag equal to 0, when frame_packing_arrangement is equal to 5, to indicate that the current decoded frame is constituent frame 1 and the previous decoded frame in output order is constituent frame 0, and the display time of the constituent frame 1 should not be delayed for purposes of stereo-view pairing. Accordingly, a video decoder, such as video decoder 30, need not delay the display time of constituent frame 1 when the value of current_frame_is_frame0_flag is equal to 0.

When video encoder 20 does not set the value of frame_packing_arrangement_type equal to 5, the constituent frame associated with the upper-left sample of the decoded frame may be considered to be constituent frame 0 and the other constituent frame may be considered to be constituent frame 1. When frame_packing_arrangement_type is not equal to 5 video encoder 20 may set the value of current_frame_is_frame0_flag equal to 0. When frame_packing_arrangement_type is not equal to 5, the value 1 for current_frame_is_frame0_flag may be reserved for future use by ITU-T|ISO/IEC. When frame_packing_arrangement_type is not equal to 5, decoders may ignore the value of current_frame_is_frame0_flag.

Video encoder 20 may set the value of frame0_self_contained_flag equal to 1 to indicate that no inter prediction operations within the decoding process for the samples of constituent frame 0 of the coded video sequence refer to samples of any constituent frame 1. Video encoder 20 may set the value of frame0_self_contained_flag equal to 0 to indicate that some inter prediction operations within the decoding process for the samples of constituent frame 0 of the coded video sequence may or may not refer to samples of some constituent frame 1. When frame_packing_arrangement_type is equal to 0 or 1, video encoder 20 may set the value of frame0_self_contained_flag equal to 0. When frame_packing_arrangement_type is equal to 0 or 1, the value 1 for frame0_self_contained_flag may be reserved for future use by ITU-T|ISO/IEC. When frame_packing_arrangement_type is equal to 0 or 1, video decoders may ignore the value of frame0_self_contained_flag. Within a coded video sequence, video encoder 20 may set the value of frame0_self_contained_flag in all frame packing arrangement SEI messages to the same value.

Video encoder 20 may set the value of frame1_self_contained_flag equal to 1 to indicate that no inter prediction operations within the decoding process for the samples of constituent frame 1 of the coded video sequence refer to samples of any constituent frame 0. Video encoder 20 may set the value of frame1_self_contained_flag equal to 0 to indicate that some inter prediction operations within the decoding process for the samples of constituent frame 1 of the coded video sequence may or may not refer to samples of some constituent frame 0. When frame_packing_arrangement_type is equal to 0 or 1, it is a requirement of bitstream conformance that frame1_self_contained_flag shall be equal to 0. When frame_packing_arrangement_type is equal to 0 or 1, the value 1 for frame1_self_contained_flag may be reserved for future use by ITU-T|ISO/IEC. When frame_packing_arrangement_type is equal to 0 or 1, video decoders may ignore the value of frame1_self_contained_flag. Within a coded video sequence, video encoder 20 may set the value of frame1_self_contained_flag in all frame packing arrangement SEI messages to the same value.

When frame0_self_contained_flag is equal to 1 or frame1_self_contained_flag is equal to 1, and frame_packing_arrangement_type is equal to 2, the decoded frame may be a non-macroblock-level adaptive frame/field (MBAFF) frame.

In some examples, video encoder 20 may set both the value of frame0_self_contained_flag equal to 1 and frame1_self_contained_flag equal to 1. In this manner, video encoder 20 may signal that the respective views can be decoded and rendered separately.

Video encoder 20 may set the value of frame0_grid_position_x (when present) to specify the horizontal location of the upper left sample of constituent frame 0 to the right of the spatial reference point in units of one sixteenth of the luma sample grid spacing between the samples of the columns of constituent frame 0 that are present in the decoded frame (prior to any upsampling for display or other purposes).

Video encoder 20 may set the value of frame0_grid_position_y (when present) to specify the vertical location of the upper left sample of constituent frame 0 below the spatial reference point in units of one sixteenth of the luma sample grid spacing between the samples of the rows of constituent frame 0 that are present in the decoded frame (prior to any upsampling for display or other purposes).

Video encoder 20 may set the value of frame1_grid_position_x (when present) specifies the horizontal location of the upper left sample of constituent frame 1 to the right of the spatial reference point in units of one sixteenth of the luma sample grid spacing between the samples of the columns of constituent frame 1 that are present in the decoded frame (prior to any upsampling for display or other purposes).

Video encoder 20 may set the value of frame1_grid_position_y (when present) specifies the vertical location of the upper left sample of constituent frame 1 below the spatial reference point in units of one sixteenth of the luma sample grid spacing between the samples of the rows of constituent frame 1 that are present in the decoded frame (prior to any upsampling for display or other purposes).

Frame_packing_arrangement_reserved_byte may be reserved for future use by ITU-T|ISO/IEC. Video encoder 20 may set the value of frame_packing_arrangement_reserved_byte equal to 0. All other values of frame_packing_arrangement_reserved_byte may be reserved for future use by ITU-T|ISO/IEC. Video decoders may ignore (e.g., remove from the bitstream and discard) the value of frame_packing_arrangement_reserved_byte.

Video encoder 20 may set the value of frame_packing_arrangement_repetition_period to specify the persistence of the frame packing arrangement SEI message, which may specify a frame order count interval within which another frame packing arrangement SEI message with the same value of frame_packing_arrangement_id or the end of the coded video sequence video encoder 20 has made present in the bitstream.

Video encoder 20 may set the value of frame_packing_arrangement_repetition_period in the range of 0 to 16,384, inclusive.

Video encoder 20 may set the value of frame_packing_arrangement_repetition_period equal to 0 to specify that the frame packing arrangement SEI message applies to the current decoded frame only. Video encoder 20 may set the value of frame_packing_arrangement_repetition_period equal to 1 to specify that the frame packing arrangement SEI message persists in output order until any of the following conditions are true: a new coded video sequence begins, or a frame in an access unit containing a frame packing arrangement SEI message with the same value of frame_packing_arrangement_id is output having PicOrderCnt( ) greater than PicOrderCnt (CurrPic).

Video encoder 20 may set the value of frame_packing_arrangement_repetition_period equal to 0 or equal to 1 to indicate that another frame packing arrangement SEI message with the same value of frame_packing_arrangement_id may or may not be present. Video encoder 20 may set the value of frame_packing_arrangement_repetition_period greater than 1 to specify that the frame packing arrangement SEI message persists until any of the following conditions are true: a new coded video sequence begins, or a frame in an access unit containing a frame packing arrangement SEI message with the same value of frame_packing_arrangement_id is output having PicOrderCnt( ) greater than PicOrderCnt(CurrPic) and less than or equal to PicOrderCnt(CurrPic)+frame_packing_arrangement_repetition_period.

Video encoder 20 may set the value of frame_packing_arrangement_repetition_period greater than 1 to indicate that another frame packing arrangement SEI message with the same value of frame_packing_arrangement_frames_id is present for a frame in an access unit that is output having PicOrderCnt( ) greater than PicOrderCnt(CurrPic) and less than or equal to PicOrderCnt(CurrPic)+frame_packing_arrangement_repetition_period, unless the bitstream ends or a new coded video sequence begins without output of such a frame.

Video encoder 20 may set the value of frame_packing_arrangement_extension_flag equal to 0 to indicate that no additional data follows within the frame packing arrangement SEI message. In this case, video encoder 20 may set the value of frame_packing_arrangement_extension_flag equal to 0. The value 1 for frame_packing_arrangement_extension_flag may be reserved for future use by ITU-T|ISO/IEC. Video decoders may ignore the value 1 for frame_packing_arrangement_extension_flag in a frame packing arrangement SEI message and may ignore all data that follows within a frame packing arrangement SEI message after the value 1 for frame_packing_arrangement_extension_flag.

Mode select unit 40 may receive raw video data in the form of blocks from the view 0 picture. After encoding the view 0 picture, video encoder 20 may downsample a view 1 picture that corresponds to the view 0 picture. That is, the view 0 picture and the view 1 picture may have been captured at substantially the same time. After downsampling the view 1 picture, video encoder 20 may encode the view 1 picture. Video encoder 20 may also store a decoded version of the view 0 picture in reference frame store 64, such that motion estimation unit 42 and motion compensation unit 44 may perform inter-view prediction with respect to the view 0 picture when encoding the view 1 picture.

Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may involve fetching or generating the predictive block based on the motion vector (or displacement vector) determined by motion estimation unit 42. Again, motion estimation unit 42 and motion compensation unit 44 may be functionally integrated, in some examples.

Motion estimation unit 42 may calculate a motion vector for a video block of an inter-coded picture by comparing the video block to video blocks of a reference frame in reference frame store 64. Motion compensation unit 44 may also interpolate sub-integer pixels of the reference frame, e.g., an I-frame or a P-frame. The ITU-T H.264 standard refers to "lists" of reference frames, e.g., list 0 and list 1. List 0 includes reference frames having a display order earlier than the current picture, while list 1 includes reference frames having a display order later than the current picture. Motion estimation unit 42 compares blocks of one or more reference frames from reference frame store 64 to a block to be encoded of a current picture, e.g., a P-picture or a B-picture. When the reference frames in reference frame store 64 include values for sub-integer pixels, a motion vector calculated by motion estimation unit 42 may refer to a sub-integer pixel location of a reference frame. Motion estimation unit 42 sends the calculated motion vector to entropy coding unit 56 and motion compensation unit 44. The reference frame block identified by a motion vector may be referred to as a predictive block. Motion compensation unit 44 calculates residual error values for the predictive block of the reference frame.

Motion estimation unit 42 may be configured to perform inter-view prediction for view 1 pictures, in which case motion estimation unit 42 may calculate displacement vectors between blocks of the view 1 picture and corresponding blocks of a reference frame of view 0. When calculating a displacement vector, motion estimation unit 42 may set the value of the motion vector relative to the position of the current block in the reduced resolution picture separate from the asymmetric frame, rather than a position of the current block as positioned within the asymmetric packed frame.

Suppose, for example, that the position of the current block in the reduced resolution picture is $(x_0, y_0)$. Suppose further that video encoder 20 will pack the asymmetric frame with a top-bottom frame packing arrangement. The full resolution picture may have a height of h pixels and a width of w pixels. Accordingly, motion estimation unit 42 may calculate the displacement vector relative to $(x_0, 2*(y_0-h))$. As another example, suppose instead that video encoder 20 will pack the asymmetric frame with a side-by-side frame packing arrangement. In this example, motion estimation unit 42 may calculate the displacement vector relative to $(2*(x_0-w), y_0)$. Thus, motion estimation unit 42 may calculate the displacement vector relative to the position of the current block in the reduced resolution frame standing alone, rather than the position of the current block in the asymmetric frame. Motion compensation unit 44 may calculate prediction data based on the predictive block. Video encoder 20 forms a residual video block, indicating residual error between the pixels values of the block to be coded and the predictive block, by subtracting the prediction data from motion compensation unit 44 from the original video block being coded. Summer 50 represents the component or components that perform this subtraction operation.

Alternatively, video encoder 20 may be configured to encode view 1 pictures as fields. Rather than encoding a pair of interlaced top and bottom fields for view 1 pictures, however, video encoder 20 may be configured to encode only a single field for each of the view 1 pictures. Video encoder 20 may further encode the view 1 pictures as fields relative to either fields of previously coded view 1 pictures or top or bottom fields of view 0 pictures. Each of the previously coded view 0 pictures may include both a top field and a bottom field. It should be understood that although video encoder 20 may be configured to encode view 1 pictures as fields, video encoder 20 may still encode view 0 pictures as frames.

To encode a picture of view 1 as a field, motion estimation unit 42 may be configured to compare the picture of view 1 to previously coded pictures of view 1 that have been decoded, or top or bottom fields of previously coded view 0 pictures that have been decoded. Field coded pictures may comprise one-half of the vertical resolution of the full resolution picture. In general, a field of a picture may comprise a top field, comprising even-numbered lines of the picture, or a bottom field, comprising odd-numbered lines of the picture. Accordingly, to encode a view 1 picture relative to a previously coded view 1 picture that is now decoded, video encoder 20 may select a field for the view 1 picture (e.g., a top field or a bottom field of the view 1 picture), select a previously coded view 1 picture that is now decoded as a reference picture, and calculate the difference between the selected field and the reference picture. Similarly, to encode a view 1 picture relative to a previously coded view 0 picture that is now decoded, video encoder 20 may perform similar steps, but additionally determine whether to encode the view 1 picture relative to a top field or a bottom field of the view 0 reference picture.

Transform unit 52 applies a transform, such as a discrete cosine transform (DCT), integer transform, or a conceptually similar transform, to the residual block, producing a video block comprising residual transform coefficient values. Transform unit 52 may perform other transforms, such as those defined by the H.264 standard, which are conceptually similar to DCT. Wavelet transforms, integer transforms, sub-band transforms or other types of transforms could also be used. In any case, transform unit 52 applies the transform to the residual block, producing a block of residual transform coefficients. Transform unit 52 may convert the residual information from a pixel value domain to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter.

Following quantization, entropy coding unit 56 entropy codes the quantized transform coefficients. For example, entropy coding unit 56 may perform content adaptive variable length coding (CAVLC), context adaptive binary arithmetic coding (CABAC), or another entropy coding technique. Following the entropy coding by entropy coding unit 56, the encoded video may be transmitted to another device or archived for later transmission or retrieval. In the case of context adaptive binary arithmetic coding (CABAC), context may be based on neighboring macroblocks.

In some cases, entropy coding unit 56 or another unit of video encoder 20 may be configured to perform other coding functions, in addition to entropy coding. For example, entropy coding unit 56 may be configured to determine the CBP values for the macroblocks and partitions. Also, in some cases, entropy coding unit 56 may perform run length coding of the coefficients in a macroblock or partition thereof. In particular, entropy coding unit 56 may apply a zig-zag scan or other scan pattern to scan the transform coefficients in a macroblock or partition and encode runs of zeros for further compression. Entropy coding unit 56 also may construct header information with appropriate syntax elements for transmission in the encoded video bitstream.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame store 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame store 64. The reconstructed video block may be used by motion estimation unit 42 and motion compensation unit 44 as a reference block to inter-code a block in a subsequent video frame.

Figure 3:
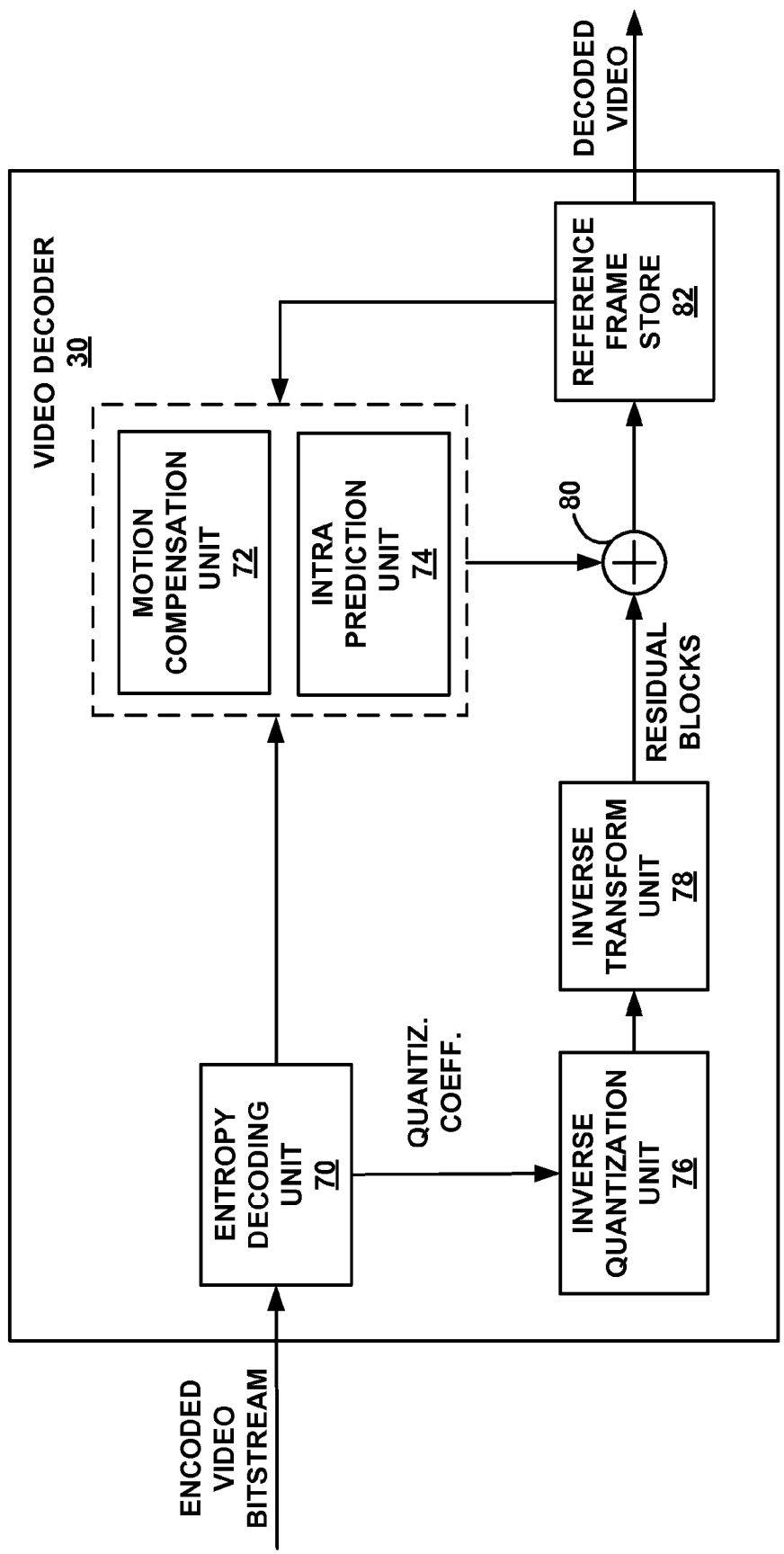
FIG. 3 is a block diagram illustrating an example of a video decoder, which decodes an encoded video sequence.

FIG. 3 is a block diagram illustrating an example of video decoder 30, which decodes an encoded video sequence. In the example of FIG. 3, video decoder 30 includes an entropy decoding unit 70, motion compensation unit 72, intra prediction unit 74, inverse quantization unit 76, inverse transformation unit 78, reference frame store 82 and summer 80. Video decoder 30 may, in some examples, perform a decoding pass generally reciprocal to the encoding pass described with respect to video encoder 20 (FIG. 2).

In particular, video decoder 30 may be configured to receive a bitstream including asymmetric packed frames. Video decoder 30 may receive information indicative of whether the bitstream includes asymmetric packed frames, and if so, a frame packing arrangement for the asymmetric packed frames. For example, video decoder 30 may be configured to interpret frame packing arrangement SEI messages. Video decoder 30 may also be configured to determine whether to decode both pictures in an asymmetric packed frame, or only one of the two pictures, e.g., the full resolution picture. This determination may be based on whether video display 32 (FIG. 1) is able to display three-dimensional video data, whether video decoder 30 has the capability to decode two views (and upsample a reduced resolution view) of a particular bitrate and/or framerate, or other factors regarding video decoder 30 and/or video display 32.

When destination device 40 is not able to decode and/or display three-dimensional video data from asymmetric packed frames, video decoder 30 may unpack received asymmetric frames into constituent full resolution encoded pictures and reduced resolution encoded pictures, then discard the reduced resolution encoded pictures. Thus, video decoder 30 may elect to only decode the full-resolution pictures of, e.g., view 0. On the other hand, when destination device 40 is capable of decoding and displaying three-dimensional video data of asymmetric packed frames, video decoder 30 may unpack received asymmetric frames into constituent full and reduced resolution encoded pictures, decode the full and reduced resolution encoded pictures, upsample the reduced resolution picture, and send the pictures to video display 32. In some examples, video decoder 30 may receive asymmetric packed frames via HDMI.

Video encoder 30 may further receive information indicating whether a reduced resolution encoded picture of an asymmetric frame is encoded as a field or as a picture. When encoded as a picture, video encoder 30 may retrieve displacement vectors for inter-view encoded reduced resolution pictures, or motion vectors for intra-view, inter-prediction encoded reduced resolution pictures. Video encoder 30 may use the displacement or motion vectors to retrieve a prediction block to decode a block of the reduced resolution picture. After decoding the reduced resolution picture, video encoder 30 may upsample the decoded picture to the same resolution as the full resolution picture of the same asymmetric frame.

Motion compensation unit 72 may generate prediction data based on motion vectors received from entropy decoding unit 70. Motion compensation unit 72 may use motion vectors received in the bitstream to identify a prediction block in reference frames in reference frame store 82. Intra prediction unit 74 may use intra prediction modes received in the bitstream to form a prediction block from spatially adjacent blocks. Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard. The inverse quantization process may also include use of a quantization parameter $QP_Y$ calculated by encoder 20 for each macroblock to determine a degree of quantization and, likewise, a degree of inverse quantization that should be applied.

Inverse transform unit 58 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 uses some of the syntax information to determine sizes of macroblocks used to encode frame(s) of the encoded video sequence, partition information that describes how each macroblock of a frame of the encoded video sequence is partitioned, modes indicating how each partition is encoded, one or more reference frames (or lists) for each inter-encoded macroblock or partition, and other information to decode the encoded video sequence.

Summer 80 sums the residual blocks with the corresponding prediction blocks generated by motion compensation unit 72 or intra-prediction unit to form decoded blocks. If desired, a deblocking filter may also be applied to filter the decoded blocks in order to remove blockiness artifacts. The decoded video blocks are then stored in reference frame store 82, which provides reference blocks for subsequent motion compensation and also produces decoded video for presentation on a display device (such as display device 32 of FIG. 1).

When a reduced resolution picture of an asymmetric frame is encoded as a field, video encoder 30 may use a top field or a bottom field of a previously decoded picture of the other view as a reference field for decoding the reduced resolution encoded picture. Video encoder 30 may also use a previously decoded reduced resolution picture of the same view as a reference field, where the previously decoded reduced resolution pictures may be stored in reference frame store 82 prior to upsampling. In this manner, video decoder 30 may decode the reduced resolution encoded picture relative to a reduced resolution decoded picture of the same view, or relative to a top or bottom field of a full resolution decoded picture of the opposite view. After decoding the reduced resolution picture, video decoder 30 may store the reduced resolution decoded picture in reference frame store 82, then upsample the reduced resolution decoded picture to form a full resolution picture of the corresponding view.

FIG. 4 is a conceptual diagram illustrating pictures 100, 102 of a left eye view and a right eye view being combined by video encoder 20 to form an asymmetric packed frame 104. In this example, video encoder 20 receives picture 100, including raw video data of a left eye view of a scene, and picture 102, including raw video data of a right eye view of the scene. The left eye view may correspond to view 0, while the right eye view may correspond to view 1. Pictures 100, 102 may correspond to two pictures of the same temporal instance. For example, pictures 100, 102 may have been captured by cameras at substantially the same time.

In the example of FIG. 4, samples of picture 100 are indicated with X's, while samples (e.g., pixels) of picture 102 are indicated with O's. In this example, video encoder 20 encodes picture 100, downsamples and encodes picture 102, and combines the pictures to form asymmetric packed frame 104. In this example, video encoder 20 arranges the full resolution encoded picture for picture 100 and the reduced resolution encoded picture for picture 102 in a top-bottom arrangement within asymmetric packed frame 104. To downsample picture 102, video encoder 20 may decimate alternate rows of picture 102. As another example, video encoder 20 may entirely remove alternate rows of picture 102 to produce a downsampled version of picture 102. As still another example, video encoder 20 may quincunx (checkerboard) sample picture 102, and arrange these samples in rows within asymmetric packed frame 104.

In the illustration of FIG. 4, asymmetric packed frame 104 includes X's corresponding to data from picture 100 and O's corresponding to data from picture 102. However, it should be understood that the data of asymmetric packed frame 104 corresponding to picture 102 will not necessarily align exactly with data of picture 102 following downsampling. Likewise, following encoding, the data of the pictures in asymmetric packed frame 104 will likely be different than the data of pictures 100, 102. Accordingly, it should not be assumed that the data of one X in asymmetric packed frame 104 is necessarily identical to a corresponding X in picture 100. Similarly, it should not be assumed that the data of one O in asymmetric packed frame 104 is identical to a corresponding O in picture 102, or that the O's of asymmetric packed frame 104 have the same resolution as O's of picture 102.

Asymmetric packed frame 104 may correspond to a top-bottom frame packing arrangement. That is, data corresponding to picture 100 is placed on top of data corresponding to picture 102 in asymmetric packed frame 104. Although illustrated in rows, data corresponding to picture 102 in asymmetric packed frame 104 may be quincunx (checkerboard) sampled, and thus, may be upsampled using a quincunx arrangement as well. Alternatively, data corresponding to picture 102 in asymmetric packed frame 104 may be sampled from alternate rows of picture 102, in which case the data may be upsampled by, e.g., interpolating alternate rows of the data following decoding.

FIG. 5 is a conceptual diagram illustrating pictures 100, 102 of a left eye view and a right eye view being combined by video encoder 20 to form an asymmetric packed frame 106. In this example, video encoder 20 receives picture 100, including raw video data of a left eye view of a scene, and picture 102, including raw video data of a right eye view of the scene. Pictures 100, 102 may correspond to two pictures of the same temporal instance. For example, pictures 100, 102 may have been captured by cameras at substantially the same time.

In the example of FIG. 5, samples of picture 100 are indicated with X's, while samples of picture 102 are indicated with O's. In this example, video encoder 20 encodes picture 100, downsamples and encodes picture 102, and combines the pictures to form asymmetric packed frame 106. In this example, video encoder 20 arranges the full resolution encoded picture for picture 100 and the reduced resolution encoded picture for picture 102 in a side-by-side arrangement within asymmetric packed frame 106. To downsample picture 102, video encoder 20 may decimate alternate columns of picture 102. Alternatively, video encoder 20 may entirely remove alternate columns of picture 102 to produce a downsampled version of picture 102.

In the illustration of FIG. 5, asymmetric packed frame 106 includes X's corresponding to data from picture 100 and O's corresponding to data from picture 102. However, it should be understood that the data of asymmetric packed frame 106 corresponding to picture 102 will not necessarily align exactly with data of picture 102 following downsampling. Likewise, following encoding, the data of the pictures in asymmetric packed frame 106 will likely be different than the data of pictures 100, 102. Accordingly, it should not be assumed that the data of one X in asymmetric packed frame 106 is necessarily identical to a corresponding X in picture 100. Similarly, it should not be assumed that the data of one O in asymmetric packed frame 106 is identical to a corresponding O in picture 102, or that the O's of asymmetric packed frame 106 have the same resolution as O's of picture 102.

Asymmetric packed frame 106 may correspond to a side-by-side frame packing arrangement. That is, data corresponding to picture 100 is arranged side-by-side with data corresponding to picture 102. Although illustrated in columns, data corresponding to picture 102 in asymmetric packed frame 106 may be quincunx (checkerboard) sampled, and thus, may be upsampled using a quincunx arrangement as well. Alternatively, data corresponding to picture 102 in asymmetric packed frame 106 may be sampled from alternate columns of picture 102, in which case the data may be upsampled by, e.g., interpolating alternate columns of the data following decoding.

Figure 6:
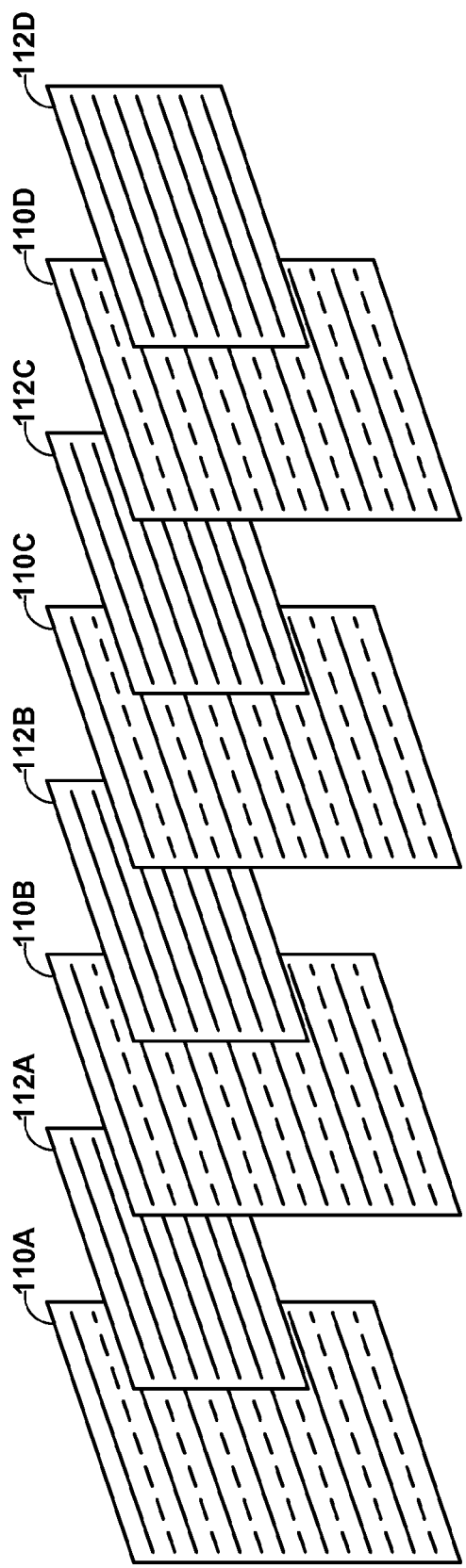
FIG. 6 is a conceptual diagram illustrating an example process for forming an asymmetric packed frame including a reduced resolution picture encoded as a field.

FIG. 6 is a conceptual diagram illustrating an example process for encoding pictures 110A-110D (pictures 110) of a left eye view as frames, while encoding pictures 112A-112D (pictures 112) of a right eye view as fields. In this example, pictures 110 correspond to a left eye view (e.g., view 0), while pictures 112 correspond to a right eye view (e.g., view 1). In general, pictures 112 may comprise downsampled pictures of the right eye view. For example, a video processing unit may decimate rows of incoming pictures of the right eye view to produce pictures 112.

A video encoder, such as video encoder 20, or a video preprocessing unit coupled to the video encoder, may receive full resolution, unencoded pictures of the left eye view and the right eye view. Video encoder 20 may reduce the resolution of pictures of the right eye view by decimating the pictures of the right eye view. In this manner, video encoder 20 may produce pictures 112 that have one-half the vertical resolution of pictures 110, but the same horizontal resolution (width) as pictures 110.

The video encoder may encode pictures 110 normally, that is, as frames. However, in this example, video encoder 20 may encode pictures 112 as fields. Video encoder 20 may encode pictures 112 relative to previously encoded (and subsequently decoded) pictures of the right eye view, or previously encoded (and subsequently decoded) pictures of the left eye view. For example, video encoder 20 may encode picture 112s relative to either the top field of one of pictures 110 or the bottom field of one of pictures 110. That is, video encoder 20 may use the top field of one of pictures 110 as a reference field to encode one of pictures 112, e.g., by calculating differences between rows of the field of the one of pictures 112 and alternate rows (starting with a top row) of the one of pictures 110. Alternatively, video encoder 20 may use the bottom field of one of pictures 110 as a reference field, in which case video encoder 20 may calculate differences between rows of the one of pictures 112 and alternate rows (starting with the row after the top row) of the one of pictures 110. In general, video encoder 20 may encode pictures 112 relative to previously coded pictures 112 and top and/or bottom fields of previously coded pictures 110.

Video encoder 20 may form independent access units from pictures 110 and pictures 112. Together, pictures 110A and 112A may form a stereo image pair. Likewise, pictures 110B and 112B may form a stereo image pair, pictures 110C and 112C may form a stereo image pair, and pictures 110D and 112D may form a stereo image pair. However, rather than forming an asymmetric frame including two images forming a stereo image pair, video encoder 20 may form independent access units from each of pictures 110 and 112. Video encoder 20 may output pictures 110 and 112 alternately, as illustrated in the example of FIG. 6. This technique may be referred to as frame field interleaved coding. Thus, video encoder 20 may form a bitstream including both pictures coded as frames and pictures coded as fields, and the field coded pictures may have reduced resolution relative to the frame coded pictures. Moreover, the field coded pictures may be coded relative to one or more of the frame or field coded pictures that occurs earlier in the bitstream.

Frame field interleaved coding is one example for allowing prediction of a reduced resolution picture from a full resolution picture. By coding full resolution pictures as frames and coding reduced resolution pictures as fields, a relatively high coding and bitstream efficiency may be achieved. Decoded pictures 110 may be treated as complementary field pairs and used as reference pictures when a reduced resolution field, that is, one of pictures 112, is coded. In some examples, each picture of one view (e.g., the left view or view 0) may be coded as a frame, while each picture of the other view (e.g., the right view or view 1) may be coded as a field. Accordingly, the view including full resolution encoded pictures may be referred to as a full resolution view or a high resolution view, while the view including reduced resolution encoded pictures may be referred to as a reduced resolution view or a low resolution view.

This technique may be used as an extension of H.264/AVC in some examples. In some examples, this technique may be used as an extension to future coding standards, such as H.265, assuming these standards support both frame and field coding. Thus, these techniques do not necessarily require new coding tools at the block level.

Figure 7:
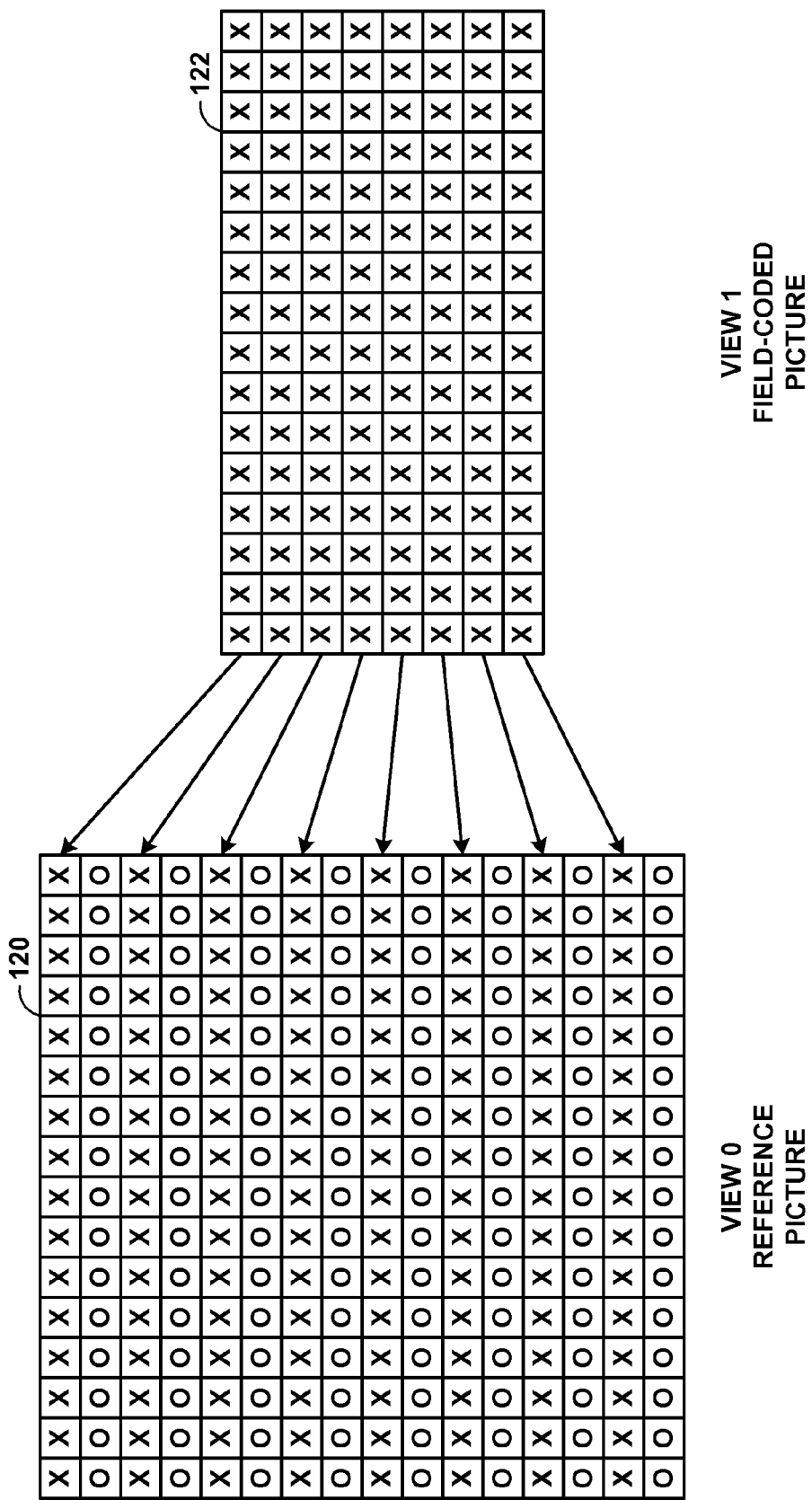
FIG. 7 is a conceptual diagram illustrating field encoding of a picture to produce a reduced resolution encoded picture for inclusion in an asymmetric packed frame.

FIG. 7 is a conceptual diagram illustrating field encoding of a picture to produce a reduced resolution encoded picture for inclusion in an asymmetric packed frame. FIG. 7 illustrates picture 120 as a view 0 (e.g., left eye view) reference picture and picture 122 as a view 1 (e.g., right eye view) picture to be coded as a field. In this example, rows of pixels of the view 0 reference picture corresponding to the top field of picture 120 are illustrated with X's, while rows of pixels of picture 120 corresponding to the bottom field of picture 120 are illustrated with O's.

In this example, picture 122 is encoded as a field relative to the top field of picture 120. Thus, rows of picture 122 may be predicted from the top field of picture 120. In other words, an encoder may use the top field of picture 122 as a reference field. For each pixel in picture 122, the video encoder may calculate the difference between the pixel and a collocated pixel in the corresponding row of the top field of picture 122. The video encoder may then encode an identifier of picture 122, an indication that the top field of picture 122 was used to predict the encoded version of picture 122, and the residual values (that is, the calculated differences between picture 122 and the top field of picture 120) to encode picture 122. The video encoder may then output the encoded version of picture 122, e.g., interleaved between two frame-coded pictures of view 0, as shown in FIG. 6.

Figure 8:
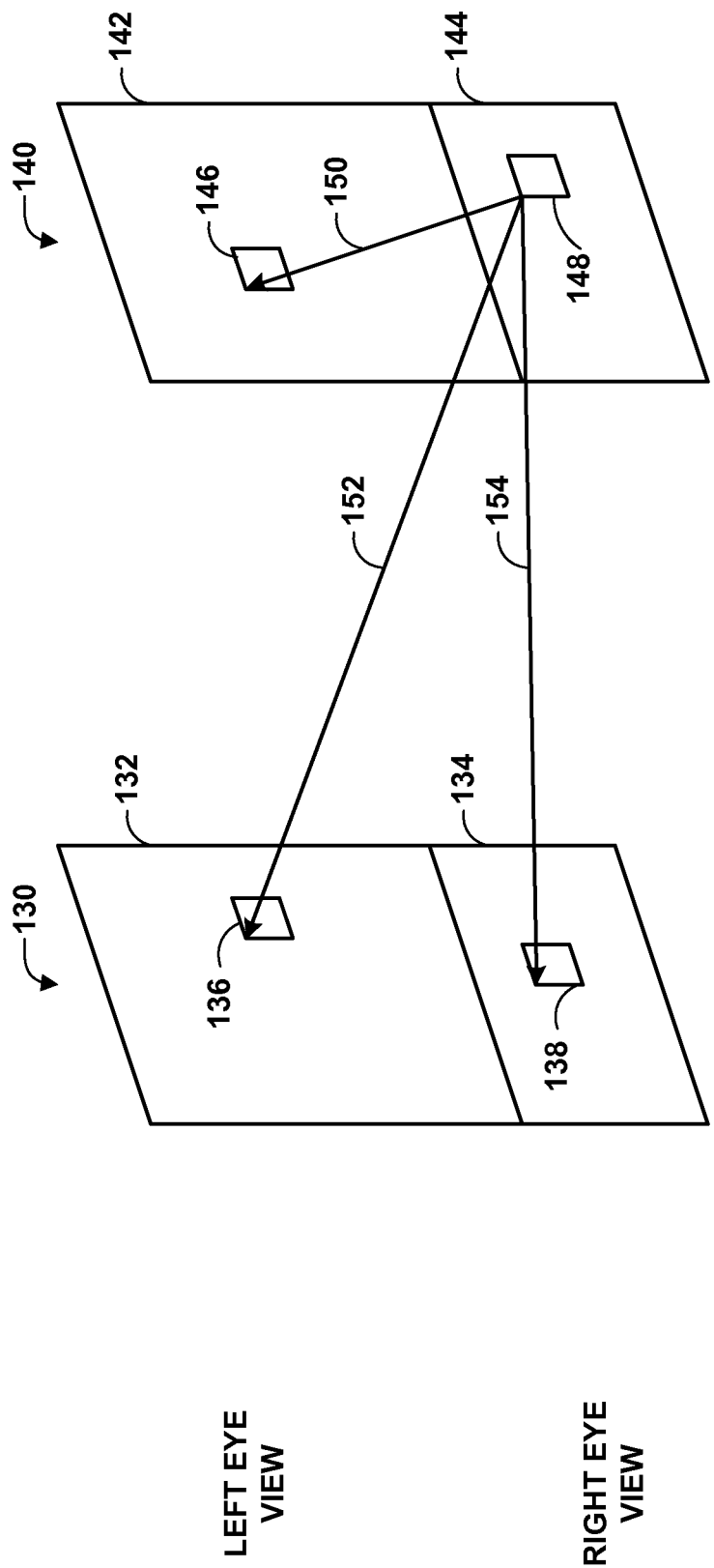
FIG. 8 is a conceptual diagram illustrating inter-view prediction of a block of a reduced resolution encoded picture of an asymmetric packed frame.

FIG. 8 is a conceptual diagram illustrating inter-view prediction of a block 148 of a reduced resolution encoded picture 144 of an asymmetric packed frame 140. FIG. 8 illustrates two example asymmetric packed frames 130, 140. Asymmetric packed frame 130 includes full resolution encoded picture 132, corresponding to a left eye view (e.g., view 0), and reduced resolution encoded picture 134, corresponding to a right eye view (e.g., view 1). Asymmetric packed frame 140 includes full resolution encoded picture 142, corresponding to the left eye view, and reduced resolution encoded picture 144, corresponding to the right eye view.

Reduced resolution encoded picture 144 includes block 148, which may be intra-view predicted, e.g., relative to block 138 of reduced resolution encoded picture 134 of asymmetric frame 130. The example of FIG. 8 illustrates motion vector 154 that indicates a location of block 138 relative to block 148. Alternatively, block 148 may be inter-view predicted relative to, e.g., block 146 of full resolution encoded picture 142 of asymmetric packed frame 140 (as shown by displacement vector 150) or block 136 of full resolution encoded picture 132 of asymmetric packed frame 130 (as shown by displacement vector 152).

Displacement vector 150 may indicate the location of block 146 relative to block 148 in full resolution encoded picture 142. Displacement vector 152 may indicate the location of block 136 relative to block 148 in full resolution encoded picture 132 of asymmetric frame 130. Displacement vector 154 (which may be considered a motion vector) may indicate the location of block 138 relative to block 148 in reduced resolution encoded picture 134. In this manner, block 148 may be intra-view inter-frame encoded, inter-view intra-frame encoded, or inter-view inter-frame encoded. Accordingly, three encoding modes may exist: prediction of block 148 from the same view, (e.g., the right eye view) in different frames as illustrated by the example of displacement vector 154, prediction of block 148 from the same frame in the other view (e.g., the left eye view) as illustrated by the example of displacement vector 150, and prediction of block 148 from a different frame and the other view (e.g., the left eye view) as illustrated by the example of displacement vector 152.

As noted above, a video encoder, such as video encoder 20, may calculate displacement vectors 150, 152, 154 relative to the location of reference block 148 external to asymmetric packed frame 140. That is, displacement vectors 150, 152, 154 may be calculated relative to the location of block 148 as if picture 144 was not combined with picture 142, but was a separate picture. To do so, let the location of block 148 within asymmetric frame 140 be identified at position $(x_0, y_0)$. Let full resolution picture 142 have a height of h pixels and width of w pixels.

In one example, assuming that asymmetric packed frame 140 has a top-bottom packing arrangement, as illustrated in the example of FIG. 8, picture 144 may have the same width as full resolution picture 142 (that is, a width of w pixels), but a height less than the height of full resolution picture 142. For example, picture 144 may have a height of h/2 pixels. In this example, displacement vectors 150, 152 may be calculated relative to location $(x_0, 2*(y_0-h))$. More generally, if reduced resolution picture 144 has a height of n*h/d, displacement vectors 150, 152 may be calculated relative to location $(x_0, (d/n)*(y_0-h))$ and displacement vector 154 may be calculated relative to location $(x_0, y_0)$.

As another example, assuming that asymmetric packed frame 140 has a side-by-side packing arrangement, picture 144 may have the same height as full resolution picture 142 (that is, a height of h pixels), but a width less than the width of full resolution picture 142. For example, picture 144 may have a width of w/2 pixels. In this example, displacement vectors 150, 152 may be calculated relative to location $(2*(x_0-w), y_0)$. More generally, if reduced resolution picture 144 has a width of n*w/d, displacement vectors 150, 152 may be calculated relative to location $((d/n)*(x_0-w), y_0)$.

Figure 9:
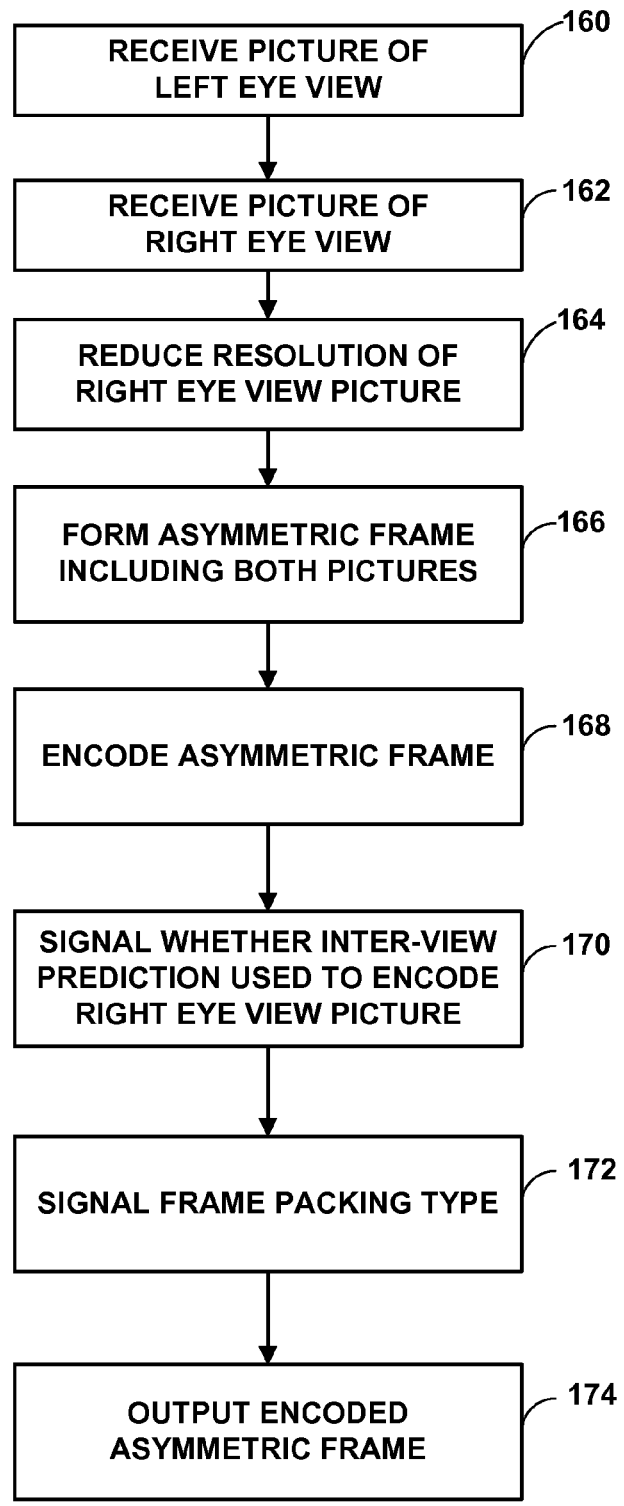
FIG. 9 is a flowchart illustrating an example method for encoding two pictures of two different views and combining the pictures to form an asymmetric packed frame.

FIG. 9 is a flowchart illustrating an example method for combining two pictures of two different views into an asymmetric packed frame and encoding the asymmetric packed frame. Although generally described with respect to the example components of FIGS. 1 and 2, it should be understood that other encoders, encoding units, and encoding devices may be configured to perform the method of FIG. 9. Moreover, the steps of the method of FIG. 9 need not necessarily be performed in the order shown in FIG. 9, and additional or alternative steps may be performed.

In the example of FIG. 9, video encoder 20 first receives a picture of a left eye view (160), e.g., view 0. Video encoder 20 may also receive a picture of a right eye view, e.g., view 1, (162), such that the two received pictures form a stereo image pair. The left eye view and the right eye view may form a stereo view pair, also referred to as a complementary view pair. The received right eye view picture may correspond to the same temporal location as the received left eye view picture. That is, the left eye view picture and the right eye view picture may have been captured or generated at substantially the same time. Video encoder 20 may then reduce the resolution of the right eye view picture (166). In some examples, a preprocessing unit of video encoder 20 may receive the pictures. In some examples, the video preprocessing unit may be external to video encoder 20.

In the example of FIG. 9, video encoder 20 reduces the resolution of the right eye view picture (164). For example, video encoder 20 may subsample the received right eye view picture (e.g., using row-wise, column-wise, or quincunx (checkerboard) subsampling), decimate rows or columns of the received right eye view picture, or otherwise reduce the resolution of the received right eye view picture. In some examples, video encoder 20 may produce a reduced resolution picture having either half of the width or half of the height of the full resolution picture of the left eye view. In other examples including a video preprocessor, the video preprocessor may be configured to reduce the resolution of the right eye view picture.

Video encoder 20 may then form an asymmetric frame including both the received left eye view picture and the downsampled right eye view picture (166). For example, video encoder 20 may form an asymmetric frame having a top-bottom arrangement, assuming that the right eye view picture has the same width as the left eye view picture. In some examples, video encoder 20 may form an asymmetric frame with a top-bottom arrangement in which the full resolution picture is above the reduced resolution picture, e.g., where the left eye view picture is placed above the right eye view picture with a reduced resolution. In other examples, video encoder 20 may form an asymmetric frame with a top-bottom arrangement in which the full resolution picture is below the reduced resolution picture, e.g., where the left eye view picture is placed below the right eye view picture with a reduced resolution. In still other examples, e.g., where the reduced resolution picture has the same height but a reduced width relative to the full resolution picture, video encoder 20 may form an asymmetric frame with a side-by-side arrangement, and the full resolution picture may be placed either to the left or to the right of the reduced resolution picture.

Video encoder 20 may then encode the asymmetric frame (168). In some examples, video encoder 20 may be configured to encode the right eye view picture portion of the asymmetric frame only relative to previously coded data of the right eye view. Thus, video encoder 20 may encode the reduced resolution picture in an intra-prediction (I-prediction) mode, relative to other data of the same picture, or in an inter-prediction (P-prediction or B-prediction) mode, relative to data of one or more previously encoded pictures of the right eye view.

In other examples, video encoder 20 may be configured to encode the reduced resolution right eye view picture portion of the asymmetric frame relative to either data of the right eye view or of the left eye view. For example, video encoder 20 may encode the reduced resolution right eye view picture relative to the left eye view portion of the asymmetric frame. Video encoder 20 may also encode the reduced resolution right eye view portion of the asymmetric frame relative to left eye view portions of previously encoded asymmetric frames.

Video encoder 20 may encode the reduced resolution right eye view picture relative to either a picture of the right eye view or relative to a picture of the left eye view of a previously encoded asymmetric frame. Thus, video encoder 20 may encode each block of the right eye view portion of the current asymmetric frame in an inter-mode relative to blocks of previously encoded right eye view pictures, blocks of the left eye view picture portion of the same asymmetric frame, or blocks of previously encoded left eye view portions of previously encoded asymmetric frames. As noted above, to encode the blocks of the current picture, video encoder 20 may calculate displacement vectors relative to the location of the block in the reduced resolution right eye view picture, rather than to the location of the block positioned within the asymmetric packed frame.

After encoding the asymmetric frame, video encoder 20 may signal whether inter-view prediction is used to encode the right eye view picture (170). For example, video encoder 20 may generate a frame packing arrangement SEI message that indicates both whether asymmetric packed frames are present in a bitstream formed by video encoder 20, and if so, whether any of the asymmetric packed frames includes a reduced resolution picture encoded in an inter-view prediction mode.

Video encoder 20 may also signal a frame packing type for the asymmetric packed frame (172). For example, video encoder 20 may include information in the frame packing arrangement SEI message discussed above indicating a frame packing arrangement for the asymmetric packed frame, e.g., side-by-side or top-bottom packing. Moreover, video encoder 20 may include information indicating the relative locations of the data for the full resolution picture and the data for the reduced resolution picture, e.g., in the frame packing arrangement SEI message.

Video encoder 20 may then output the asymmetric frame (174). For example, video encoder 20, or a unit coupled to video encoder 20, may store the asymmetric frame to a computer-readable storage medium, broadcast the asymmetric frame, transmit the asymmetric frame via network transmission or network broadcast, or otherwise provide the encoded video data. In some examples, video encoder 20, or a unit coupled to video encoder 20, may output the asymmetric frame via a high definition multimedia interface (HDMI).

It should also be understood that video encoder 20 need not necessarily provide information indicating whether a bitstream includes asymmetric packed frames, and frame packing arrangements and indications of locations of full and reduced resolution pictures in the frames, for each frame of the bitstream. In some examples, video encoder 20 may provide a single set of information, e.g., a single frame packing SEI message, for the entire bitstream indicating this information for each frame of the bitstream. In some examples, video encoder 20 may provide the information periodically, e.g., after each video fragment, group of pictures (GOP), video segment, every certain number of frames, or at other periodic intervals. Video encoder 20, or another unit associated with video encoder 20, may also provide the frame packing arrangement SEI message on demand in some examples. e.g., in response to a request from a client device for the frame packing arrangement SEI message or a general request for header data of the bitstream.

Figure 10:
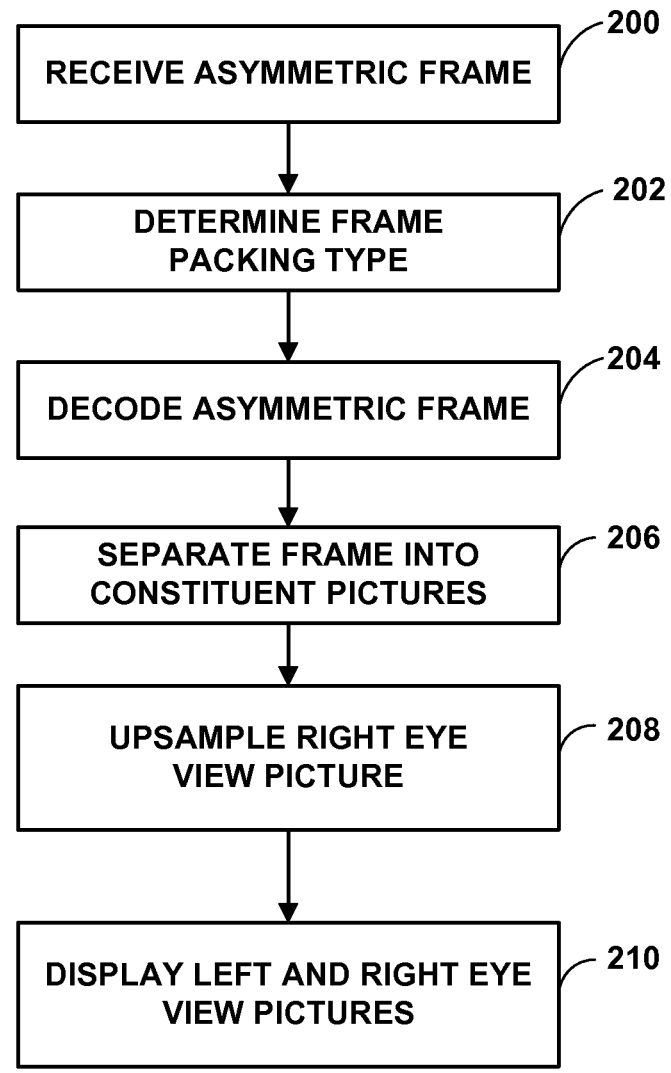
FIG. 10 is a flowchart illustrating an example method for decoding an asymmetric frame.

FIG. 10 is a flowchart illustrating an example method for decoding an asymmetric frame. Although generally described with respect to the example components of FIGS. 1 and 3, it should be understood that other decoders, decoding units, and decoding devices may be configured to perform the method of FIG. 10. Moreover, the steps of the method of FIG. 10 need not necessarily be performed in the order shown in FIG. 10, and additional or alternative steps may be performed.

Initially, video decoder 30 may receive an asymmetric frame (200). In some examples, video decoder 30, or a unit coupled to video decoder 30, may receive the asymmetric frame via a high definition multimedia interface (HDMI). Video decoder 30 may then determine a frame packing type for the asymmetric frame (202). For example, video decoder 30 may receive a frame packing arrangement SEI message indicating the frame packing type for the asymmetric frame (e.g., top-bottom or side-by-side), as well as locations of a full resolution picture and a reduced resolution picture in the asymmetric frame. In some examples, video decoder 30 may have previously received a frame packing arrangement SEI message for the bitstream, prior to receiving the asymmetric frame, in which case video decoder 30 may have determined the frame packing type for frames of the bitstream (including the most recently received asymmetric frame) prior to receiving the asymmetric frame.

Based on the frame packing type information, video decoder 30 may decode the asymmetric frame (204). Video decoder 30 may first decode the left eye view portion of the asymmetric frame, followed by the right eye view portion of the asymmetric frame. Video decoder 30 may determine the locations of the left eye view and right eye view portions of the asymmetric frame based on the frame packing type information. In some examples, video decoder 30 may decode the right eye view picture relative to a left eye view picture.

After decoding the asymmetric frame, video decoder 30 may separate the decoded frame into constituent pictures, e.g., the left eye view picture and the right eye view picture (206). Video decoder 30 may store a copy of the left eye view picture for reference to decode other left eye view pictures and, in some examples, right eye view pictures. Video decoder 30 may also store a copy of the decoded right eye view picture, e.g., before upsampling, for use as a reference picture for decoding right eye view portions of subsequently received asymmetric frames.

Maintaining the example above, the right eye view picture may also have a reduced resolution, although in other examples the right eye view picture may have full resolution and the left eye view picture may have reduced resolution. Accordingly, video decoder 30 may upsample the right eye view picture (208), e.g., by interpolating missing information to form a full resolution version of the right eye view picture. In this manner, video decoder 30 may form a right eye view picture having the same resolution as the left eye view picture. Video decoder 30 may then send the decoded left and right eye view pictures to video display 32, which may display the left and right eye view pictures simultaneously or nearly simultaneously (212).

Figure 11:
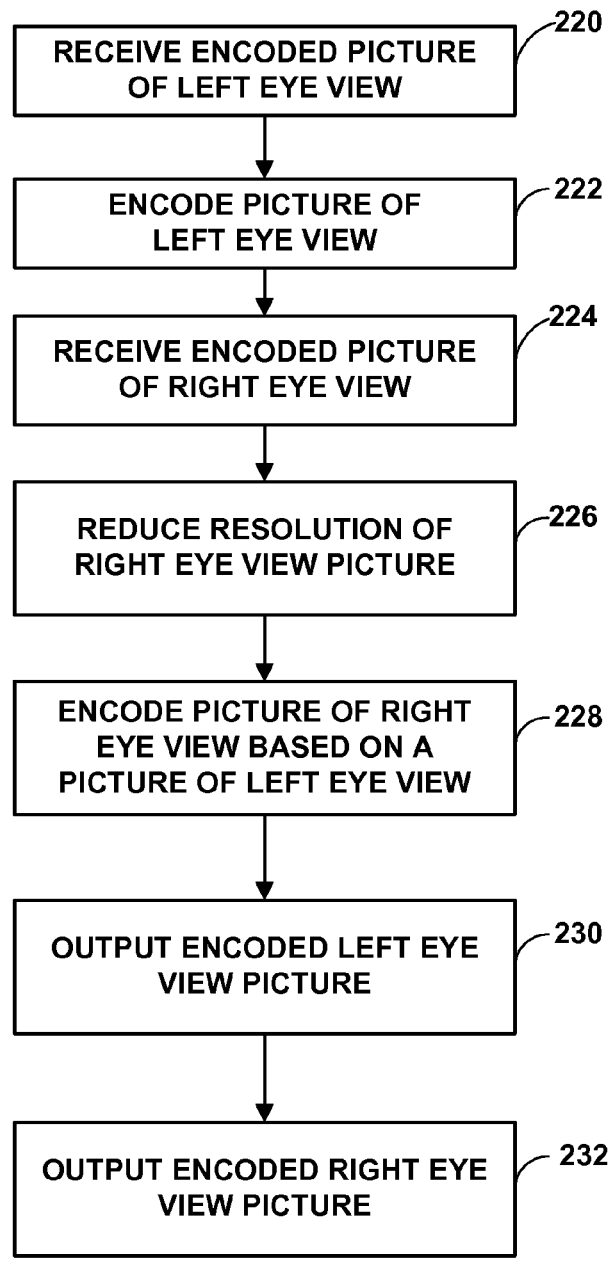
FIG. 11 is a flowchart illustrating an example method for performing frame field interleaved coding in accordance with the techniques of this disclosure.

FIG. 11 is a flowchart illustrating an example method for performing frame field interleaved coding in accordance with the techniques of this disclosure. Although generally described with respect to the example components of FIGS. 1 and 2, it should be understood that other encoders, encoding units, and encoding devices may be configured to perform the method of FIG. 11. Moreover, the steps of the method of FIG. 9 need not necessarily be performed in the order shown in FIG. 11, and additional or alternative steps may be performed.

Initially, video encoder 20 may receive a left eye view picture, e.g., a picture of view 0 (220). Video encoder 20 may then encode the left eye view picture (222), e.g., as a frame in either an intra- or an inter-prediction mode. Thus, video encoder 20 may encode the left eye view picture relative to other data of the same picture, or relative to one or more reference pictures of the left eye view.

Video encoder 20 may also receive a picture of a right eye view, e.g., view 1, (224), such that the right eye view picture and the left eye view picture form a stereo image pair. The left eye view and the right eye view may form a stereo view pair, also referred to as a complementary view pair. The received right eye view picture may correspond to the same temporal location as the received left eye view picture. That is, the left eye view picture and the right eye view picture may have been captured or generated at substantially the same time. Video encoder 20 may then reduce the resolution of the right eye view picture (226). In some examples, a video preprocessing unit of video encoder 20 may receive the right eye view picture and reduce the resolution of the right eye view picture prior to encoding. In some examples, the video preprocessing unit may be external to video encoder 20.

To reduce the resolution of the right eye view picture, video encoder 20 (or a video preprocessing unit) may decimate the right eye view picture, in some examples. In this manner, video encoder 20 may reduce the resolution of the right eye view picture, in this example, which may have one-half the vertical resolution of the left eye view picture.

Video encoder 20 may then encode the reduced resolution picture of the right eye view picture based on a picture of the left eye view (228). That is, video encoder 20 may use a previously coded left eye view picture as a reference picture for encoding the right eye view picture. Although in some cases video encoder 20 may use the left eye view picture encoded at step 222 as a reference picture for encoding the right eye view picture, in general, video encoder 20 may use any previously encoded picture of the left eye view as a reference picture. Thus, video encoder 20 is not limited to using the left eye view picture encoded at step 222 as the reference picture for encoding the right eye view picture. In some examples, video encoder 20 may use a previously encoded right eye view picture as the reference picture for encoding the current right eye view picture. That is, video encoder 20 may determine whether to use a previously encoded left eye view picture or a previously encoded right eye view picture as a reference picture for encoding the current right eye view picture. Furthermore, in some examples, video encoder 20 may select between intra and inter-mode encode of the current right eye view picture.

Video encoder 20 may encode the right eye view picture as a field. Accordingly, to encode the right eye view picture, video encoder 20 may calculate the difference between rows of the right eye view picture and alternate rows of the referenced left eye view picture. In this manner, video encoder 20 may encode the right eye view picture as a field referring to either a top field or a bottom field of a previously encoded left eye view picture.

Video encoder 20 may then output the encoded left eye view picture (230) and the encoded right eye view picture (232). In this example, video encoder 20 may output the encoded pictures into the same bitstream as separate access units, rather than forming an asymmetric packed frame. The bitstream may therefore include full resolution encoded pictures of the left eye view and reduced resolution encoded pictures of the right eye view, where the left eye view pictures are encoded as frames and the right eye view pictures are encoded as fields. The bitstream may resemble the illustration of FIG. 6, such that the bitstream is frame field interleaved encoded.

Figure 12:
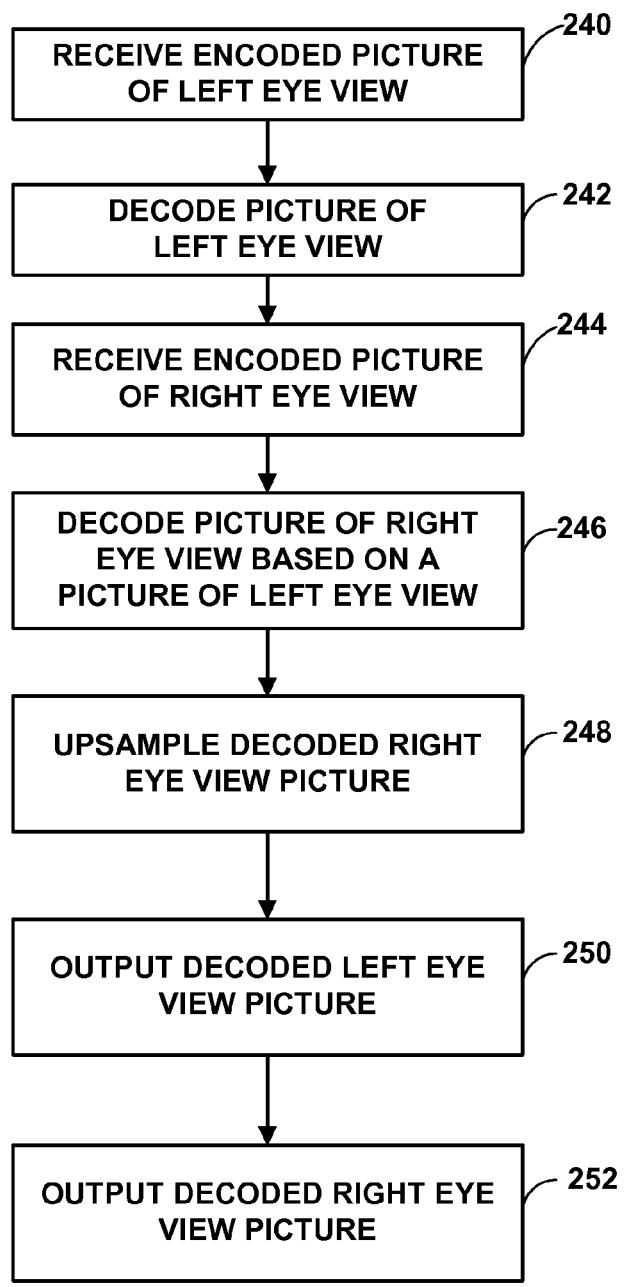
FIG. 12 is a flowchart illustrating an example method for decoding a frame field interleaved coded bitstream in accordance with the techniques of this disclosure.

FIG. 12 is a flowchart illustrating an example method for decoding a frame field interleaved coded bitstream in accordance with the techniques of this disclosure. Although generally described with respect to the example components of FIGS. 1 and 3, it should be understood that other decoders, decoding units, and decoding devices may be configured to perform the method of FIG. 12. Moreover, the steps of the method of FIG. 10 need not necessarily be performed in the order shown in FIG. 12, and additional or alternative steps may be performed.

Video decoder 30 may be configured to receive and decode a frame field interleaved encoded bitstream. Accordingly, video decoder 30 may receive an encoded picture of a left eye view, e.g., view 0 (240). Video decoder 30 may then decode the left eye view picture (242). Video decoder 30 may also receive an encoded picture of a right eye view, e.g., view 1 (244). The left eye view and right eye view may form a stereo view pair, also referred to as a complementary view pair. In this example, the left eye view picture and the right eye view picture may form independent access units, even though the two pictures may correspond to the same temporal period. For example, the two pictures may have been captured nearly simultaneously, such that the two pictures form a stereo image pair for producing a three-dimensional video playback.

Video decoder 30 may decode the right eye view picture based on a previously decoded left eye view picture (246). That is, video decoder 30 may use a left eye view picture as a reference picture when decoding the right eye view picture. Although the reference picture may comprise the picture decoded at step 242, the reference picture may generally comprise any previously decoded picture of the left eye view. To decode the right eye view picture, video decoder 30 may add values of rows of the received, encoded right eye view picture to alternate rows of the reference picture, e.g., a top field or a bottom field of the reference picture. The bitstream may include information indicating a reference picture for the right eye view picture, as well as whether to use the top field or the bottom field as the reference field for decoding the right eye view picture. In other examples, video decoder 30 may further be configured to determine whether to decode the right eye view picture relative to a top field or a bottom field of a left eye view picture, or relative to a previously decoded right eye view picture.

After decoding the right eye view picture, video decoder 30 may upsample the decoded right eye view picture (248). For example, video decoder 30 may be configured to interpolate missing rows of information of the decoded right eye view picture. Video decoder 30 may output the decoded left eye view picture (250) and the decoded and upsampled right eye view picture (252). For example, video decoder 30 may send the decoded pictures to a display, which may display the pictures simultaneously or nearly simultaneously.

In some examples, video decoder 30 may be included within a device that is not capable of three-dimensional video playback. In such examples, video decoder 30 may simply decode the left eye view pictures and skip (e.g., discard) the right eye view pictures. In this manner, devices may be capable of receiving and decoding a frame field interleaved encoded bitstream whether or not the devices are capable of decoding and/or rendering three-dimensional video data.

Although generally described with respect to a video encoder and a video decoder, the techniques of this disclosure may be implemented in other devices and coding units. For example, the techniques for forming an asymmetric packed frame may be performed by a transcoder configured to receive two separate, complementary bitstreams and to transcode the two bitstreams to form a single bitstream including asymmetric packed frames. As another example, the techniques for disassembling an asymmetric packed frame may be performed by a transcoder configured to receive a bitstream including asymmetric packed frames and to produce two separate bitstreams corresponding to respective views of the asymmetric packed frame, each including encoded video data for a respective view.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of encoding video data, the method comprising:
   receiving a first picture of a first view of a scene having a first resolution;
   receiving a second picture of a second view of the scene having a reduced resolution relative to the first resolution;
   forming an asymmetric frame comprising the first picture and the second picture, wherein the asymmetric frame comprises the first picture and the second picture as a single frame;
   encoding the asymmetric frame, wherein encoding the asymmetric frame comprises encoding the single frame;
   forming a supplemental enhancement information (SEI) message comprising an asymmetric packing indicator value that indicates that the asymmetric frame is an asymmetric frame, a frame packing arrangement type value indicating that the first picture and the second picture have one of a side-by-side arrangement and a top-bottom arrangement, and information indicating a location of the first picture relative to the second picture in the asymmetric frame;

encapsulating the asymmetric frame in a video coding layer (VCL) network abstraction layer (NAL) unit;

encapsulating the SEI message in a non-VCL NAL unit;

encapsulating the VCL NAL unit including the asymmetric frame and the non-VCL NAL unit including the SEI message in an access unit, wherein the access unit corresponds to a specific time instance; and outputting the access unit.

2. The method of claim 1, wherein the reduced resolution of the second picture is one-half of the first resolution of the first picture, and wherein forming the SEI message comprises forming the SEI message to indicate that the second picture in the asymmetric frame comprises one-half of the first resolution of the first picture.

3. The method of claim 1, wherein forming the asymmetric frame comprises arranging the first picture and the second picture in a side-by-side arrangement, and wherein forming the SEI message comprises forming the SEI message to indicate that the asymmetric frame is formed in the side-by-side arrangement and that the first picture and the second picture have the same height.

4. The method of claim 1, wherein asymmetric packed pictures form a frame in a top-bottom arrangement, and wherein forming the SEI message comprises forming the SEI message to indicate that the asymmetric frame is formed in the top-bottom arrangement and that the first picture and the second picture have the same width.

5. The method of claim 1, wherein encapsulating the asymmetric frame comprises forming at least one of a file conforming to ISO base media file format, a file conforming to an extension of the ISO base media file format, data conforming to an MPEG-2 transport stream, header information for an MPEG-2 transport stream, or data in accordance with hypertext transfer protocol (HTTP) streaming format.

6. The method of claim 1, wherein the first resolution comprises a first spatial resolution defined by a first horizontal resolution and a first vertical resolution, wherein the reduced resolution is defined by a second horizontal resolution and a second vertical resolution, and wherein either the second horizontal resolution is equal to the first horizontal resolution or the second vertical resolution is equal to the first vertical resolution.

7. An apparatus for encoding video data, the apparatus comprising:

a memory configured to store video data and a video encoder configured to:

receive a first picture of a first view of a scene having a first resolution, receive a second picture of a second view of the scene having a reduced resolution relative to the first resolution, form an asymmetric frame of the video data, the asymmetric frame comprising the first picture and the second picture, wherein the asymmetric frame comprises the first picture and the second picture as a single frame, encode the asymmetric frame, wherein to encode the asymmetric frame, the video encoder is configured to encode the single frame, form a supplemental enhancement information (SEI) message comprising an asymmetric packing indicator value that indicates that the asymmetric frame is an asymmetric frame, a frame packing arrangement type value indicating that the first picture and the second picture have one of a side-by-side arrangement and a top-bottom arrangement, and information indicating a location of the first picture relative to the second picture in the asymmetric frame, encapsulate the asymmetric frame in a video coding layer (VCL) network abstraction layer (NAL) unit, encapsulate the SEI message in a non-VCL NAL unit, and encapsulate the VCL NAL unit including the asymmetric frame and the non-VCL NAL unit including the SEI message in an access unit, wherein the access unit corresponds to a specific time instance.

8. The apparatus of claim 7, wherein the reduced resolution of the second picture is one-half of the first resolution of the first picture, and wherein the video encoder is configured to form the SEI message to indicate that the second picture in the asymmetric frame comprises one-half of the first resolution of the first picture.

9. The apparatus of claim 7, wherein the video encoder is configured to arrange the first picture and the second picture in a side-by-side arrangement in the asymmetric frame, and to form the SEI message to indicate that the asymmetric frame is formed in the side-by-side arrangement and that the first picture and the second picture have the same height.

10. The apparatus of claim 7, wherein the video encoder is configured to arrange the first picture and the second picture in a top-bottom arrangement in the asymmetric frame, and to form the SEI message to indicate that the asymmetric frame is formed in the top-bottom arrangement and that the first picture and the second picture have the same width.

11. The apparatus of claim 7, wherein the video encoder is configured to encapsulate the encoded asymmetric frame as at least one of a file conforming to ISO base media file format, a file conforming to an extension of the ISO base media file format, data conforming to an MPEG-2 transport stream, header information for an MPEG-2 transport stream, or data in accordance with hypertext transfer protocol (HTTP) streaming format.

12. The apparatus of claim 7, wherein the apparatus comprises at least one of:

an integrated circuit;

a microprocessor; or a wireless communication device that includes the video encoder.

13. The apparatus of claim 7, wherein the first resolution comprises a first spatial resolution defined by a first horizontal resolution and a first vertical resolution, wherein the reduced resolution is defined by a second horizontal resolution and a second vertical resolution, and wherein either the second horizontal resolution is equal to the first horizontal resolution or the second vertical resolution is equal to the first vertical resolution.

14. An apparatus for encoding video data, the apparatus comprising:

means for receiving a first picture of a first view of a scene having a first resolution;

means for receiving a second picture of a second view of the scene having a reduced resolution relative to the first resolution;

means for forming an asymmetric frame comprising the first picture and the second picture, wherein the asymmetric frame comprises the first picture and the second picture as a single frame;

means for encoding the asymmetric frame, wherein the means for encoding the asymmetric frame comprises means for encoding the single frame;

means for forming a supplemental enhancement information (SEI) message comprising an asymmetric packing indicator value that indicates that the asymmetric frame is an asymmetric frame, a frame packing arrangement type value indicating that the first picture and the second picture have one of a side-by-side arrangement and a top-bottom arrangement, and information indicating a location of the first picture relative to the second picture in the asymmetric frame;

means for encapsulating the asymmetric frame in a video coding layer (VCL) network abstraction layer (NAL) unit;

means for encapsulating the SEI message in a non-VCL NAL unit; and means for encapsulating the VCL NAL unit including the asymmetric frame and the non-VCL NAL unit including the SEI message in an access unit, wherein the access unit corresponds to a specific time instance.

15. The apparatus of claim 14, wherein the reduced resolution of the second picture is one-half of the first resolution of the first picture, and wherein the means for forming the SEI message comprises means for forming the SEI message to indicate that the second picture in the asymmetric frame comprises one-half of the first resolution of the first picture.

16. The apparatus of claim 14, wherein the means for forming the asymmetric frame comprises means for arranging the first picture and the second picture in a side-by-side arrangement in the asymmetric frame, and wherein the means for forming the SEI message comprises means for forming the SEI message to indicate that the asymmetric frame is formed in the side-by-side arrangement and that the first picture and the second picture have the same height.

17. The apparatus of claim 14, wherein the means for forming the asymmetric frame comprises means for arranging the first picture and the second picture in a top-bottom arrangement in the asymmetric frame, and wherein the means for forming the SEI message comprises means for forming the SEI message to indicate that the asymmetric frame is formed in the top-bottom arrangement and that the first picture and the second picture have the same width.

18. The apparatus of claim 14, wherein the first resolution comprises a first spatial resolution defined by a first horizontal resolution and a first vertical resolution, wherein the reduced resolution is defined by a second horizontal resolution and a second vertical resolution, and wherein either the second horizontal resolution is equal to the first horizontal resolution or the second vertical resolution is equal to the first vertical resolution.

19. A computer program product comprising a non-transitory computer-readable storage medium having stored thereon instructions that, when executed, cause a processor of a device for encoding video data to:

receive a first picture of a first view of a scene having a first resolution;

receive a second picture of a second view of the scene having a reduced resolution relative to the first resolution;

form an asymmetric frame comprising the first picture and the second picture, wherein the asymmetric frame comprises the first picture and the second picture as a single frame;

encode the asymmetric frame, wherein the instructions that cause the processor to encode the asymmetric frame comprise instructions that cause the processor to encode the single frame;

form a supplemental enhancement information (SEI) message comprising an asymmetric packing indicator value that indicates that the asymmetric frame is an asymmetric frame, a frame packing arrangement type value indicating that the first picture and the second picture have one of a side-by-side arrangement and a top-bottom arrangement, and information indicating a location of the first picture relative to the second picture in the asymmetric frame;

encapsulate the asymmetric frame in a video coding layer (VCL) network abstraction layer (NAL) unit;

encapsulate the SEI message in a non-VCL NAL unit;

encapsulate the VCL NAL unit including the asymmetric frame and the non-VCL NAL unit including the SEI message in an access unit, wherein the access unit corresponds to a specific time instance; and output the access unit.

20. The computer program product of claim 19, wherein the reduced resolution of the second picture is one-half of the first resolution of the first picture, wherein the instructions that cause the processor to form the SEI message comprise instructions that cause the processor to form the SEI message to indicate that the second picture in the asymmetric frame comprises one-half of the first resolution of the first picture.

21. The computer program product of claim 19, wherein the instructions that cause the processor to form the asymmetric frame comprise instructions that cause the processor to arrange the first picture and the second picture in a side-by-side arrangement, and wherein the instructions that cause the processor to form the SEI message comprise instructions that cause the processor to form the SEI message to indicate that the asymmetric frame is formed in the side-by-side arrangement and that the first picture and the second picture have the same height.

22. The computer program product of claim 19, wherein the instructions that cause the processor to form the asymmetric frame comprise instructions that cause the processor to arrange the first picture and the second picture in a top-bottom arrangement, and wherein the instructions that cause the processor to form the SEI message comprise instructions that cause the processor to form the SEI message to indicate that the asymmetric frame is formed in the top-bottom arrangement and that the first picture and the second picture have the same width.

23. The computer program product of claim 19, wherein the instructions that cause the processor to encapsulate the encoded asymmetric frame comprise instructions that cause the processor to output at least one of a file conforming to ISO base media file format, a file conforming to an extension of the ISO base media file format, data conforming to an MPEG-2 transport stream, header information for an MPEG-2 transport stream, or data in accordance with hypertext transfer protocol (HTTP) streaming format.

24. The computer program product of claim 19, wherein the first resolution comprises a first spatial resolution defined by a first horizontal resolution and a first vertical resolution, wherein the reduced resolution is defined by a second horizontal resolution and a second vertical resolution, and wherein either the second horizontal resolution is equal to the first horizontal resolution or the second vertical resolution is equal to the first vertical resolution.

25. A method of decoding video data, the method comprising:

receiving an access unit corresponding to a specific time instance, the access unit comprising an encoded asymmetric frame, encapsulated in a video coding layer (VCL) network abstraction layer (NAL) unit, the encoded asymmetric frame comprising a first resolution picture of a first view of a scene and a reduced resolution picture of a second view of the scene, the reduced resolution picture having a reduced resolution relative to a first resolution of the first resolution picture, the asymmetric frame comprising the first resolution picture and the reduced resolution picture as a single frame, the access unit further comprising a supplemental enhancement information (SEI) message, encapsulated in a non-VCL NAL unit, the SEI message comprising an asymmetric packing indicator value that indicates that the asymmetric frame is an asymmetric frame, a frame packing arrangement type value indicating that the first resolution picture and the reduced resolution picture have one of a side-by-side arrangement and a top-bottom arrangement, and information indicating a location of the first picture relative to the second picture in the asymmetric frame;

decoding the asymmetric frame based on the SEI message, wherein decoding the asymmetric frame comprises decoding the single frame;

separating the decoded asymmetric frame into the first resolution picture and the reduced resolution picture based on the SEI message;

upsampling the reduced resolution picture to produce a second picture of the second view of the scene having the first resolution of the first resolution picture; and outputting the first resolution picture, as a first picture, and the second picture, wherein the first picture and the second picture form a stereo image pair.

26. The method of claim 25, wherein the SEI message includes information indicating that the asymmetric frame has one of a top-bottom packing arrangement and a side-by-side packing arrangement.

27. The method of claim 26, wherein, when the SEI message indicates that the asymmetric frame has the top-bottom packing arrangement, separating the decoded asymmetric frame using the SEI message includes separating the asymmetric frame into a top portion and a bottom portion, wherein the top portion corresponds to the first resolution picture, and wherein the bottom portion corresponds to the reduced resolution picture.

28. The method of claim 26, wherein when the SEI message indicates that the asymmetric frame has the side-by-side packing arrangement, separating the decoded asymmetric frame includes separating the asymmetric frame into a left portion and a right portion, wherein the left portion corresponds to the first resolution picture, and wherein the right portion corresponds to the reduced resolution picture.

29. The method of claim 25, wherein receiving the access unit comprising the asymmetric frame comprises receiving the access unit comprising the asymmetric frame via a high definition multimedia interface (HDMI) configured to receive asymmetric frames.

30. The method of claim 25, wherein the first resolution comprises a first spatial resolution defined by a first horizontal resolution and a first vertical resolution, wherein the reduced resolution is defined by a second horizontal resolution and a second vertical resolution, and wherein either the second horizontal resolution is equal to the first horizontal resolution or the second vertical resolution is equal to the first vertical resolution.

31. An apparatus for decoding video data, the apparatus comprising:

a memory configured to store video data and a video decoder configured to:

receive an access unit of the video data, the access unit corresponding to a specific time instance, the access unit comprising an encoded asymmetric frame encapsulated in a video coding layer (VCL) network abstraction layer (NAL) unit of the video data, the encoded asymmetric frame comprising a first resolution picture of a first view of a scene and a reduced resolution picture of a second view of the scene, the reduced resolution picture having a reduced resolution relative to a first resolution of the first resolution picture, the asymmetric frame comprising the first resolution picture and the reduced resolution picture as a single frame, the access unit further comprising a supplemental enhancement information (SEI) message, encapsulated in a non-VCL NAL unit, the SEI message comprising an asymmetric packing indicator value that indicates that the asymmetric frame is an asymmetric frame, a frame packing arrangement type value indicating that the first resolution picture and the reduced resolution picture have one of a side-by-side arrangement and a top-bottom arrangement, and information indicating a location of the first resolution picture relative to the reduced resolution picture in the asymmetric frame, decode the asymmetric frame based on the SEI message, wherein to decode the asymmetric frame, the video decoder is configured to decode the single frame, and wherein the video decoder is further configured to:

separate the decoded asymmetric frame into the first resolution picture and the reduced resolution picture based on the SEI message, and upsample the reduced resolution picture to produce a second picture of the second view of the scene having the first resolution the first resolution picture, wherein the first resolution picture, when output as a first picture, and the second picture form a stereo image pair.

32. The apparatus of claim 31, further comprising a three-dimensional video display configured to display the first picture and the second picture at substantially the same time to display three-dimensional video data.

33. The apparatus of claim 31, wherein the SEI message includes information indicating that the asymmetric frame has one of a top-bottom packing arrangement and a side-by-side packing arrangement.

34. The apparatus of claim 33, wherein the video decoder is configured to separate the decoded asymmetric frame into a top portion and a bottom portion when the SEI message indicates that the asymmetric frame has the top-bottom packing arrangement, wherein the top portion corresponds to the first resolution picture, and wherein the bottom portion corresponds to the reduced resolution picture.

35. The apparatus of claim 33, wherein the video decoder is configured to separate the decoded asymmetric frame into a left portion and a right portion when the SEI message indicates that the asymmetric frame has the side-by-side packing arrangement, wherein the left portion corresponds to the first resolution picture, and wherein the right portion corresponds to the reduced resolution picture.

36. The apparatus of claim 31, further comprising a high definition multimedia interface (HDMI) configured to receive asymmetric frames and further configured to provide the asymmetric frames to the video decoder.

37. The apparatus of claim 31, wherein the apparatus comprises at least one of:

an integrated circuit;

a microprocessor; or a wireless communication device that includes the video decoder.

38. The apparatus of claim 31, wherein the first resolution comprises a first spatial resolution defined by a first horizontal resolution and a first vertical resolution, wherein the reduced resolution is defined by a second horizontal resolution and a second vertical resolution, and wherein either the second horizontal resolution is equal to the first horizontal resolution or the second vertical resolution is equal to the first vertical resolution.

39. An apparatus for decoding video data, the apparatus comprising:
   means for receiving an access unit corresponding to a specific time instance, the access unit comprising an encoded asymmetric frame, encapsulated in a video coding layer (VCL) network abstraction layer (NAL) unit, the encoded asymmetric frame comprising a first resolution picture of a first view of a scene and a reduced resolution picture of a second view of the scene, the reduced resolution picture having a reduced resolution relative to a first resolution of the first resolution picture, the asymmetric frame comprising the first resolution picture and the reduced resolution picture as a single frame, the access unit further comprising a supplemental enhancement information (SEI) message, encapsulated in a non-VCL NAL unit, the SEI message comprising an asymmetric packing indicator value that indicates that the asymmetric frame is an asymmetric frame, a frame packing arrangement type value indicating that the first resolution picture and the reduced resolution picture have one of a side-by-side arrangement and a top-bottom arrangement, and information indicating a location of the first resolution picture relative to the reduced resolution picture in the asymmetric frame;
   means for decoding the asymmetric frame based on the SEI message, wherein the means for decoding the asymmetric frame comprises means for decoding the single frame;
   means for separating the decoded asymmetric frame into the first resolution picture and the reduced resolution picture based on the SEI message; and
   means for upsampling the reduced resolution picture to produce a second picture of the second view of the scene having the first resolution of the first resolution picture, wherein the first resolution picture, when output as a first picture, and the second picture form a stereo image pair.

40. The apparatus of claim 39, wherein the SEI message includes information indicating that the asymmetric frame has one of a top-bottom packing arrangement and a side-by-side packing arrangement.

41. The apparatus of claim 40, wherein the means for separating comprises means for separating the asymmetric frame into a top portion and a bottom portion, wherein the top portion corresponds to the first resolution picture, and wherein the bottom portion corresponds to the reduced resolution picture, when the SEI message indicates that the asymmetric frame has the top-bottom packing arrangement.

42. The apparatus of claim 40, wherein the means for separating comprises means for separating the asymmetric frame into a left portion and a right portion, wherein the left portion corresponds to the first resolution picture, and wherein the right portion corresponds to the reduced resolution picture, when the SEI message indicates that the asymmetric frame has the side-by-side packing arrangement.

43. The apparatus of claim 39, wherein the means for receiving the access unit comprising the asymmetric frame comprises means for receiving the access unit comprising the asymmetric frame via a high definition multimedia interface (HDMI) configured to receive asymmetric frames.

44. The apparatus of claim 39, wherein the first resolution comprises a first spatial resolution defined by a first horizontal resolution and a first vertical resolution, wherein the reduced resolution is defined by a second horizontal resolution and a second vertical resolution, and wherein either the second horizontal resolution is equal to the first horizontal resolution or the second vertical resolution is equal to the first vertical resolution.

45. A computer program product comprising a non-transitory computer-readable storage medium having stored thereon instructions that, when executed, cause a processor of a device for decoding video data to:
   receive an access unit corresponding to a specific time instance, the access unit comprising an encoded asymmetric frame, encapsulated in a video coding layer (VCL) network abstraction layer (NAL) unit, the encoded asymmetric frame comprising a first resolution picture of a first view of a scene and a reduced resolution picture of a second view of the scene, the reduced resolution picture having a reduced resolution relative to a first resolution of the first resolution picture, the asymmetric frame comprising the first resolution picture and the reduced resolution picture as a single frame, the access unit further comprising a supplemental enhancement information (SEI) message, encapsulated in a non-VCL NAL unit, the SEI message comprising an asymmetric packing indicator value that indicates that the asymmetric frame is an asymmetric frame, a frame packing arrangement type value indicating that the first resolution picture and the reduced resolution picture have one of a side-by-side arrangement and a top-bottom arrangement, and information indicating a location of the first resolution picture relative to the reduced resolution picture in the asymmetric frame;
   decode the asymmetric frame based on the SEI message, wherein the instructions that cause the processor to decode the asymmetric frame comprise instructions that cause the processor to decode the single frame;
   separate the decoded asymmetric frame into the first resolution picture and the reduced resolution picture based on the SEI message;
   upsample the reduced resolution picture to produce a second picture of the second view of the scene having the first resolution of the first resolution picture; and
   output the first resolution picture, as a first picture, and the second picture, wherein the first picture and the second picture form a stereo image pair.

46. The computer program product of claim 45, wherein the SEI message includes information indicating that the asymmetric frame has one of a top-bottom packing arrangement and a side-by-side packing arrangement.

47. The computer program product of claim 46, wherein when the SEI message indicates that the asymmetric frame has the top-bottom packing arrangement, the instructions cause the processor to separate the asymmetric frame into a top portion and a bottom portion, wherein the top portion corresponds to the first resolution picture, and wherein the bottom portion corresponds to the reduced resolution picture.

48. The computer program product of claim 46, wherein when the SEI message indicates that the asymmetric frame has the side-by-side packing arrangement, the instructions cause the processor to separate the asymmetric frame into a left portion and a right portion, wherein the left portion corresponds to the first resolution picture, and wherein the right portion corresponds to the reduced resolution picture.

49. The computer program product of claim 45, wherein the instructions that cause the processor to receive the access unit comprising the asymmetric frame comprise instructions that cause the processor to receive the access unit comprising the asymmetric frame via a high definition multimedia interface (HDMI) configured to receive asymmetric frames.

50. The computer program product of claim 45, wherein the first resolution comprises a first spatial resolution defined by a first horizontal resolution and a first vertical resolution, wherein the reduced resolution is defined by a second horizontal resolution and a second vertical resolution, and wherein either the second horizontal resolution is equal to the first horizontal resolution or the second vertical resolution is equal to the first vertical resolution.

* * * * *